United States Patent
Xiu et al.

(10) Patent No.: US 11,620,176 B2
(45) Date of Patent: Apr. 4, 2023

(54) VISUALIZATION SYSTEM FOR DEBUG OR PERFORMANCE ANALYSIS OF SOC SYSTEMS

(71) Applicant: Beijing Tenafe Electronic Technology Co., Ltd., Beijing (CN)

(72) Inventors: Chen Xiu, Beijing (CN); Priyanka Nilay Thakore, Mountain View, CA (US); Meng Kun Lee, Cupertino, CA (US)

(73) Assignee: Beijing Tenafe Electronic Technology Co., Ltd.

( * ) Notice: Subject to any disclaimer, the term of this patent is extended or adjusted under 35 U.S.C. 154(b) by 0 days.

(21) Appl. No.: 17/858,443

(22) Filed: Jul. 6, 2022

(65) Prior Publication Data
US 2023/0045254 A1 Feb. 9, 2023

Related U.S. Application Data

(60) Provisional application No. 63/222,264, filed on Jul. 15, 2021.

(51) Int. Cl.
G06F 11/00 (2006.01)
G06F 11/07 (2006.01)

(52) U.S. Cl.
CPC ...... G06F 11/0769 (2013.01); G06F 11/0721 (2013.01)

(58) Field of Classification Search
CPC ............. G06F 11/0769; G06F 11/0721; G06F 11/0766; G06F 11/0775; G06F 11/321; G06F 11/327; G06F 11/328
See application file for complete search history.

(56) References Cited

U.S. PATENT DOCUMENTS

| | | |
|---|---|---|
| 6,795,963 B1 | 9/2004 | Andersen |
| 7,251,751 B2 | 7/2007 | Blasco Allue |
| 7,886,150 B2 | 2/2011 | Stollon |
| 9,053,251 B2 | 6/2015 | Adler |
| 9,830,241 B2 | 11/2017 | Lippett |
| 9,959,186 B2 | 5/2018 | Hutner |
| 10,691,576 B1 | 6/2020 | Shapira |

(Continued)

FOREIGN PATENT DOCUMENTS

JP 2018055326 A * 4/2018

OTHER PUBLICATIONS

Author Unknown, Intel® Quartus® Prime Pro Edition User Guide: Debug Tools, Jun. 21, 2021.

(Continued)

*Primary Examiner* — Katherine Lin
(74) *Attorney, Agent, or Firm* — Van Pelt, Yi & James LLP

(57) ABSTRACT

An interface receives reported information from a system on chip (SOC), where the reported information includes: (1) hardware-reported information that is reported by a hardware functional module included in the SOC and (2) firmware-reported information that is reported by a firmware functional module included in the SOC. A processor receives one or more display settings and generates visual information based at least in part on: (1) the one or more display settings, (2) the hardware-reported information, and (3) the firmware-reported information. The visual information is displayed via a display.

14 Claims, 17 Drawing Sheets

(56) References Cited

U.S. PATENT DOCUMENTS

| | | |
|---|---|---|
| 11,438,255 B2 | 9/2022 | Tillotson |
| 2014/0052930 A1 | 2/2014 | Gulati |
| 2014/0239987 A1 | 8/2014 | Mayer |
| 2015/0082325 A1 | 3/2015 | Aharonov |
| 2016/0077905 A1* | 3/2016 | Menon ................ G06F 11/3648 714/37 |

OTHER PUBLICATIONS

Author Unknown, ISE Tutorial: Using Xilinx ChipScope Pro ILA Core with Project Navigator to Debug FPGA Applications, Mar. 20, 2013.

* cited by examiner

| CH0 NCmd: Phy Cmd Timing | | |
|---|---|---|
| SCMD Xfer time(µs) | | 2.9 |
| Category | | Phy Cmd Timing(µs) |
| 1 78h in data xfer | | 3.45 |

| CH0 NCmd: Physical Cmd Num | | | | |
|---|---|---|---|---|
| CMD0 | CMD1 | CMD2 | Total Num | phy cmd num per 100µs |
| E1 | 0 | 0 | 91 | 13.03 |
| 6 | E0 | 0 | 51 | 7.3 |
| DA | 0 | 0 | 13 | 1.86 |
| 31 | 0 | 0 | 13 | 1.86 |
| 78 | 0 | 0 | 13 | 1.86 |

| CH1 NCmd: Phy Cmd Timing | | |
|---|---|---|
| SCMD Xfer time(µs) | | 2.9 |
| Category | | Phy Cmd Timing(µs) |
| 1 78h in data xfer | | 7.84 |
| 2 78h in data xfer | | 7 |

| CH1 NCmd: Physical Cmd Num | | | | |
|---|---|---|---|---|
| CMD0 | CMD1 | CMD2 | Total Num | phy cmd num per 100µs |
| E1 | 0 | 0 | 90 | 12.85 |
| 6 | E0 | 0 | 48 | 6.85 |
| DA | 0 | 0 | 13 | 1.86 |
| 31 | 0 | 0 | 13 | 1.86 |
| 78 | 0 | 0 | 17 | 2.43 |

| CH2 NCmd: Phy Cmd Timing | | |
|---|---|---|
| SCMD Xfer time(µs) | | 2.9 |
| Category | | Phy Cmd Timing(µs) |
| 1 78h in data xfer | | 2.04 |
| 3 78h in data xfer | | 4.79 |

| CH2 NCmd: Physical Cmd Num | | | | |
|---|---|---|---|---|
| CMD0 | CMD1 | CMD2 | Total Num | phy cmd num per 100µs |
| E1 | 0 | 0 | 94 | 13.59 |
| 6 | E0 | 0 | 52 | 7.52 |
| DA | 0 | 0 | 15 | 2.17 |
| 31 | 0 | 0 | 13 | 1.88 |
| 78 | 0 | 0 | 18 | 2.6 |
| 0 | 20 | 0 | 1 | 0.14 |
| 0 | 32 | 0 | 3 | 0.43 |
| 0 | 30 | 0 | 1 | 0.14 |

| CH3 NCmd: Phy Cmd Timing | | |
|---|---|---|
| SCMD Xfer time(µs) | | 2.9 |
| Category | | Phy Cmd Timing(µs) |
| 1 78h in data xfer | | 2.66 |

| CH3 NCmd: Physical Cmd Num | | | | |
|---|---|---|---|---|
| CMD0 | CMD1 | CMD2 | Total Num | phy cmd num per 100µs |
| E1 | 0 | 0 | 91 | 13.16 |
| DA | 0 | 0 | 13 | 1.88 |
| 31 | 0 | 0 | 13 | 1.88 |
| 6 | E0 | 0 | 52 | 7.52 |
| 78 | 0 | 0 | 13 | 1.88 |

FIG. 14 (Cont.)

VISUALIZATION SYSTEM FOR DEBUG OR PERFORMANCE ANALYSIS OF SOC SYSTEMS

CROSS REFERENCE TO OTHER APPLICATIONS

This application claims priority to U.S. Provisional Patent Application No. 63/222,264 entitled PERFORMANCE VISUALIZATION SYSTEM filed Jul. 15, 2021 which is incorporated herein by reference for all purposes.

BACKGROUND OF THE INVENTION

Unexpected behaviors in embedded and/or system on chip (SOC) systems are notoriously difficult to debug given the real-time nature and the complexity of such systems. Debugging techniques that work with other types of systems (such as invasive debug probes added at key locations in non-real-time systems, "brute force" debug in simple systems, and the addition of probes at easily accessed points in distributed systems) are not easily portable and/or feasible with some embedded and/or SOC systems. New techniques that provide better tools and/or techniques for analyzing, debugging, and/or monitoring such systems would be desirable.

BRIEF DESCRIPTION OF THE DRAWINGS

Various embodiments of the invention are disclosed in the following detailed description and the accompanying drawings.

DETAILED DESCRIPTION

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

Various embodiments of a visualization technique and/or system to analyze, debug, and/or evaluate an embedded and/or system on chip (SOC) system are described herein. As used herein, the terms "embedded system" and "SOC (system)" are used interchangeably. As will be described in more detail below, such visualization systems may eliminate the need for expensive analyzers that may be difficult to attach to a SOC system; such visualization systems may also offer features, tools, and/or operations (e.g., which offer better insight into the inefficiencies and/or errors in the SOC system) that are not supported by existing analyzers.

Figure 1:
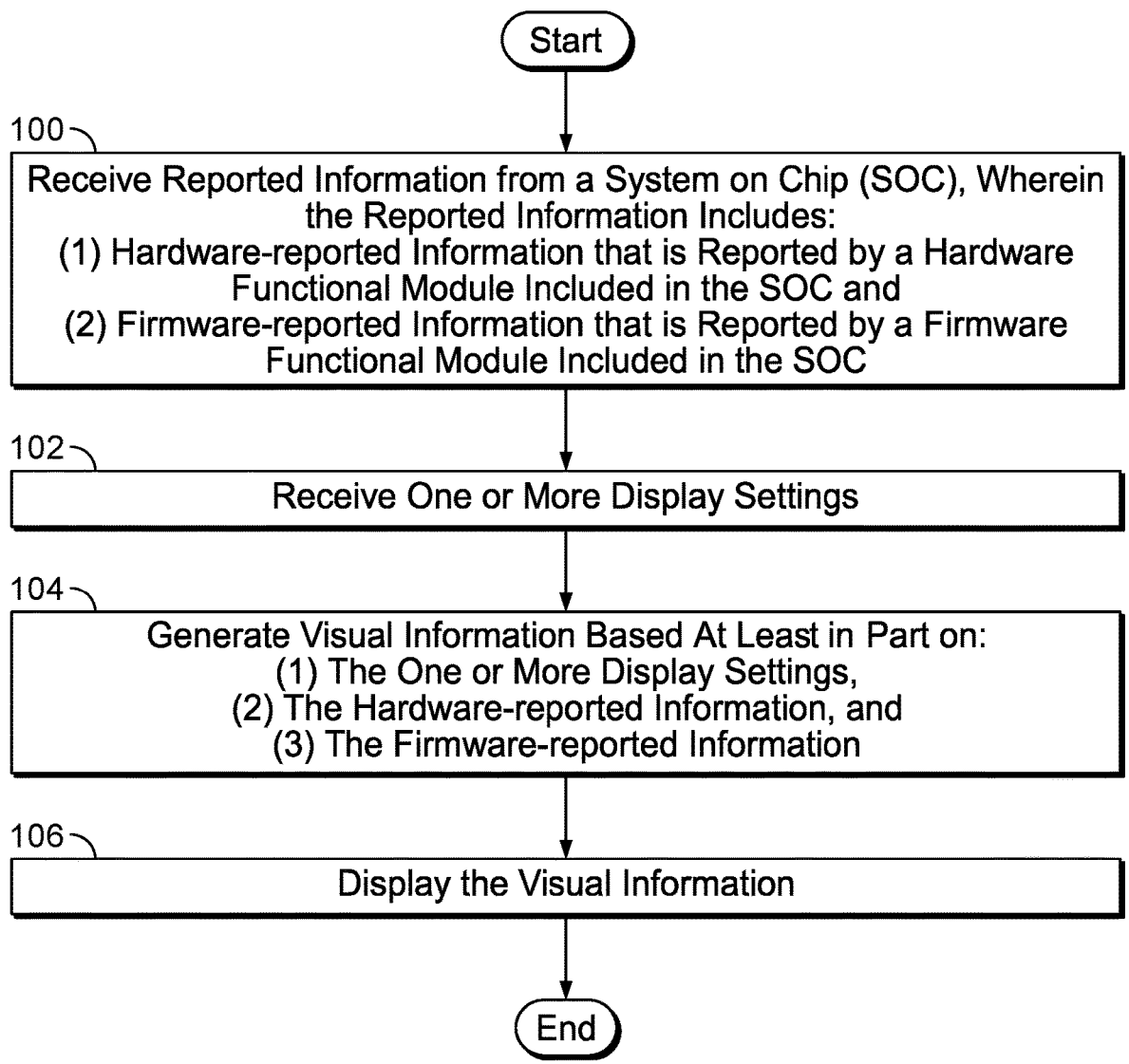
FIG. 1 is flowchart illustrating an embodiment of a process to display visual information using hardware-reported information and firmware-reported information from an SOC system.

FIG. 1 is flowchart illustrating an embodiment of a process to display visual information using hardware-reported information and firmware-reported information from an SOC system. In some embodiments, the process is performed by a visualization system. In some embodiments, a visualization system is implemented using a visualization program that runs on a (e.g., general-purpose) computer. A visualization program may be implemented on an application that is installed on the computer, using a web-based application accessible via an Internet browser application, using a computer program product embodied on a computer readable storage medium, etc.

At 100, reported information from a system on chip (SOC) is received, wherein the reported information includes: (1) hardware-reported information that is reported by a hardware functional module included in the SOC and (2) firmware-reported information that is reported by a firmware functional module included in the SOC.

In one example of step 100, the reported information from the SOC system is first stored on some storage system or storage media that is external to both the SOC system and a computer on which a visualization application runs. Using the computer's built-in interface(s), the reported information is retrieved from the (external) storage system or storage media. Alternatively, in some embodiments, the reported information is directly passed from the SOC system (that generates the reported information) to the visualization system.

At 102, one or more display settings are received. At 104, visual information is generated based at least in part on: (1) the one or more display settings, (2) the hardware-reported information, and (3) the firmware-reported information.

At 106, the visual information is displayed. For example, a built-in display of a computer (on which a visualization program is running) may be used to display the visual information. Some example screenshots are described in more detail below.

In one example of steps 102, 104, and 106, display settings associated with a sequence of "zoom ins" are received and corresponding zoomed-in visual information is generated and displayed in response. An initial set of display settings may be obtained (e.g., stored in the visualization system) that is used to generate visual information for a start screen or an initial display. This start screen (at least in this example) is at the highest (e.g., hierarchical) level of the SOC, with the available functional modules (e.g., that were configured to report status and/or event information). For example, graphical user interface displaying such a start window may include a first window with a list of the (e.g., available, reporting, etc.) hardware and firmware functional modules and another window may include (as an example) corresponding latency scatter plots associated with (e.g., high-level) operations for those functional modules.

A subsequent zoom-in instruction or interaction produces (at least in this example) a zoomed-in screen with performance metrics of the operations within the zoom range and a plot of the latency of the associated operations. For example, one window in the display may be an operation metrics table, summarizing one or more (e.g., performance) metrics associated with one or more operations. There may also be a window showing the underlying data used to calculate a given metric for a given operation. For example, the metric may be "average latency" and operations may be "read from memory" or "write to memory;" one window shows the data used to calculate the average latency for a read operation (e.g., in the form of a latency scatter plot) and another window shows the average latency for a write operation.

A further zoom in may present information at the lowest and/or most detailed level, such as operation metadata, a size of the operation or a size of a piece of data associated with the operation (e.g., the size of data being written, read, transmitted, received, transformed, etc.), the type of operation, settings associated with an operation, tag information, and used resources (e.g., from shared resources such as shared buffers, shared channels, shared RAID resources, etc.). To put it another way, the information displayed at the lower (lowest) levels may include values from the various fields in various messages (see, e.g., FIG. 3) that the (relevant) hardware functional modules and/or firmware functional modules generated and that are associated with the (e.g., selected) operations and/or events of interest.

In some embodiments, the visual information (e.g., generated at step 104 and displayed at step 106) is in the form of a 2D or 3D display. In one example, a workload view provides a user with a view of transactions and/or operations performed over time. In one 2D example, line plots of (e.g., performance) metrics are shown where the x-axis is time and the y-axis is the (e.g., performance) metric. In one 3D example, the x-axis is commands (e.g., number of commands), the y-axis is time, and the z-axis is size (e.g., of a given command or some of data associated with the command). The time values for these displays may be obtained from timestamps in messages (see, e.g., the timestamp field (330) in the event-based message (320) as well as the payload (344) in the timestamp message (340) in FIG. 3).

Before describing various features and/or embodiments of the visualization system in more detail, in may be helpful to give some examples of an SOC system that generates reported information (e.g., received at step 100) and that is analyzed by a visualization system; more detailed examples of reported information may also be helpful. The following figures describe some example SOC systems and some examples of reported information.

Figure 2:
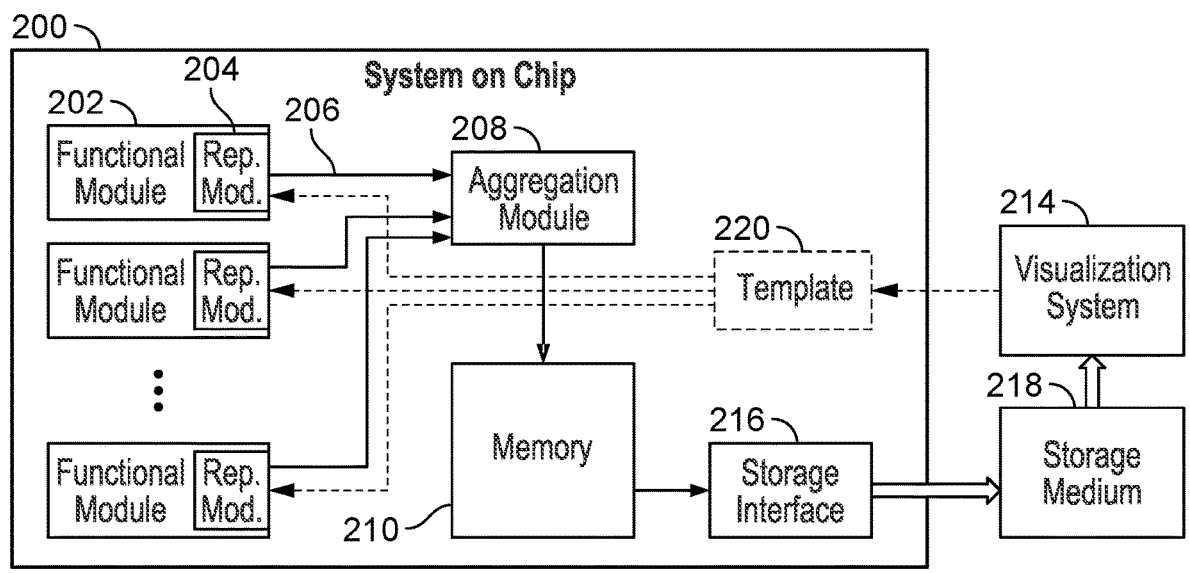
FIG. 2 is a system diagram illustrating an embodiment of an SOC system with reporting modules in each functional module to collect and store status information.

FIG. 2 is a system diagram illustrating an embodiment of an SOC system with reporting modules in each functional module to collect and store status information. In this example, the exemplary SOC system (200) includes a plurality of functional modules (202). In various embodiments, the exemplary SOC system (200) is an application-specific integrated circuit (ASIC), a field-programmable gate array (FPGA), etc. In various embodiments, a functional module (202) is a hardware module composed solely of electronic circuits, a firmware module composed of instruction code operating on a processing unit, etc.

In this example, the ability to analyze (e.g., in real-time or after some wait) the behavior and/or operation of each of the plurality of functional modules (202) is desired. For example, each of the functional module may contribute to the critical processing or movement of data, making subsequent analysis and/or review highly desirable. To that end, each functional module (202) has a sub-component, referred to in this figure as a reporting module (204), that gathers status information from within its functional module, encapsulates that status information in a standardized message format, and sends the encapsulated information on a dedicated link (206) to a central message gathering module, referred to in this figure as an aggregation module (208). In some embodiments, less critical and/or less interesting (from a debug perspective) functional modules do not have a reporting module.

In this example, each reporting module (204) includes one or more reporting rules (not shown) which describes the conditions under which time-based messages and/or event-based messages are generated and sent. These reporting rules may also describe what specific registers, values, nodes, states, etc. should be included or otherwise used as the status information that is sent to the aggregation module (208). For example, each reporting module (204) may include a controller that compares the condition(s) specified in the reporting rules against the relevant variables, states, events, etc. in that particular functional module.

In this example, messages are received from the various links (206) by the aggregation module (208) and are aggregated into a single, aggregated stream. A timestamp is then inserted into the aggregated stream to obtain a timestamped and aggregated stream. Although this example describes aggregating first and then timestamping, in some embodiments that order is reversed.

The timestamped and aggregated stream is passed from the aggregation module (208) to the memory (210). From the memory (210), the timestamped and aggregated stream is transported out of the SOC system (200) via a storage interface (216) so that the information can be exported off-chip to a (external) storage medium (218), such as Flash and/or solid state drive (SSD) memory. For example, this testing infrastructure was first prototyped and/or implemented on a storage controller and therefore the storage interface (216) was already implemented. To put it another way, in some embodiments, the storage interface (216) is a "production" interface that is/was already implemented and/or is used by the routine, non-debug-related operations supported by the SOC (200).

From the (external) storage medium (218), a visualization system (214) is configured to ingest, filter, display, and/or analyze the timestamped and aggregated stream that is obtained from the storage medium (218), as instructed by a user.

In one specific example, the SOC (200) (i.e., the device which is analyzed using the visualization system (214)) is a Flash storage controller and the storage medium (218) is the Flash storage medium that is being managed and/or controlled by the Flash storage controller. In this application, since there is a storage medium (218) that is readily available and the SOC (200) controls writing to that storage medium (e.g., so there is no concern about any captured information being accidentally overwritten by another device), the information in the memory (210) is sent off-chip via a storage interface (216). If or when analysis by a visualization system is desired, the storage medium (216) may be accessed by the information processor to retrieve the (e.g., debugging) information stored therein.

The following figure describes some examples of standardized message formats that may be used by a reporting module (204).

Figure 3:
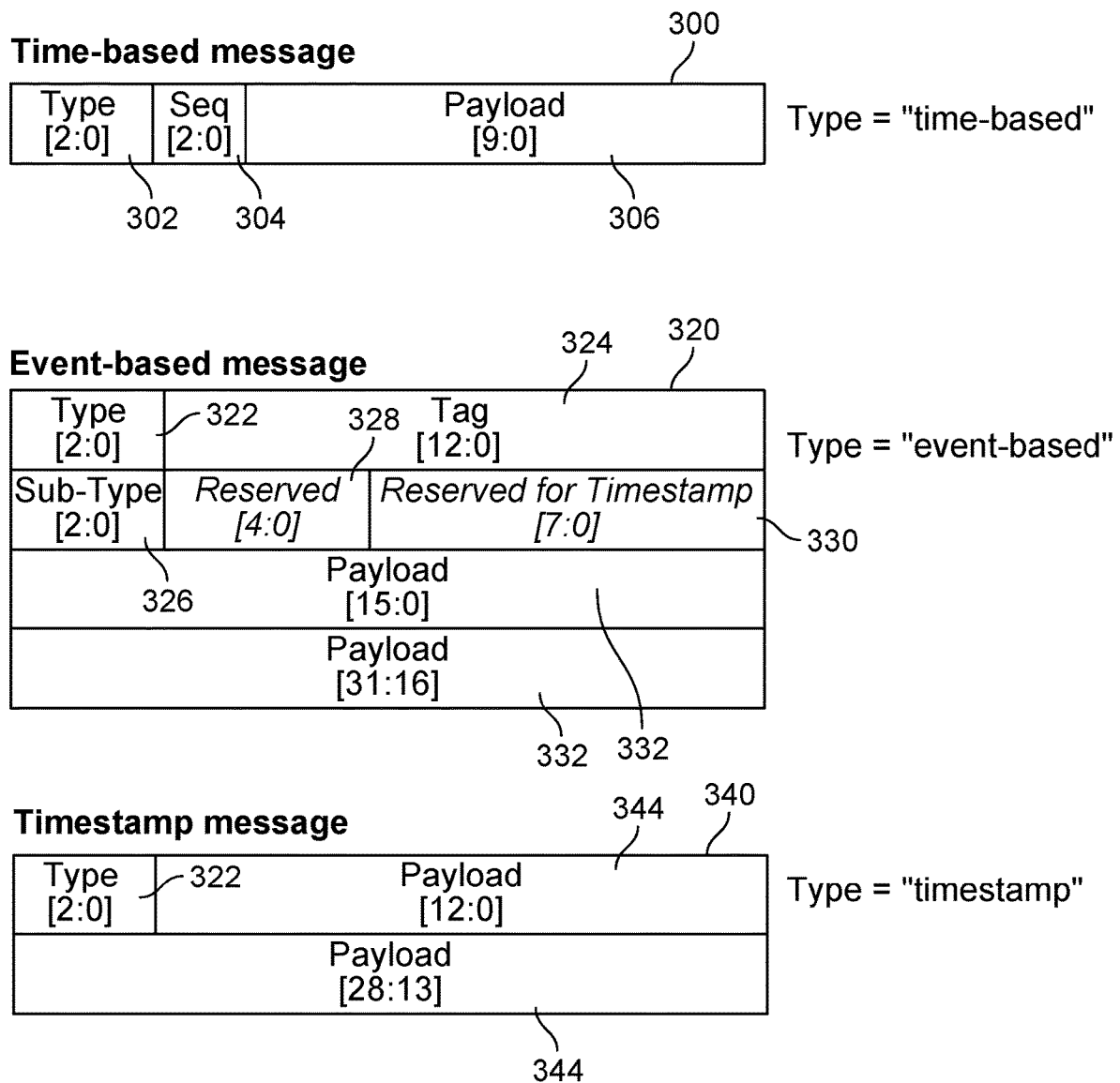
FIG. 3 is a diagram illustrating embodiments of a time-based message, an event-based message, and a timestamp message.

FIG. 3 is a diagram illustrating embodiments of a time-based message, an event-based message, and a timestamp message. These are some examples of a standardized message format in which status information may be included. These messages may be then aggregated and timestamped to create an aggregated and timestamped stream which is stored, and which a visualization system may ingest in order to analyze the SOC system that generated the messages. In FIG. 2, the reporting modules (204) may use one or more of the exemplary standardized message formats shown here to send status information to the aggregation module (208). In various embodiments, a system may support any number of standardized message formats (i.e., message types).

In this example, three message types are shown which are identified by a type field (322) in a fixed location in the message, which in this example is the first three bits of each message. The first message type in this example a time-based message (300) where the first field (comprising 3 bits) is the type field (302), with a value that identifies the message as a time-based message.

The type field (302) is followed by a 3-bit sequence field (304). This field is a time-based sequence identifier that is included for cases where the operating frequency of the given functional module is greater than the link frequency between a given reporting module (e.g., one of 204 in FIG. 2) and the aggregation module (e.g., 208 in FIG. 2). For example, this is a common occurrence when the interconnect between the ports and the aggregation modules operates at (as example) 25% of the nominal system operating frequency, which (as described above) conserves power. With the system so configured, messages may occasionally be dropped because the rate of production (e.g., by the reporting module) is greater than the rate of uptake or transport (e.g., by the aggregation module). The condition is detected and post-processed as a non-uniform increment of the sequence identifier of two adjacent messages. In one example, the sequence field (304) is incremented by one each time a new time-based message is sent so that if there is a jump of two or more, then the post-processor knows some messages have been lost. In some embodiments, the sequence number (304) is based on and/or includes some bits from the timestamp that is used for the timestamp message (340).

The next field in the time-based message (300) is the payload field (306) which has 10 bits. For example, a time-based reporting rule may specify what status information to include in the payload field (306) in a time-based message (300). In one example, time-based messages (300) are sent that include the value or state of a finite state machine when (or while) the finite state machine is not in the idle state. These time-based messages (300) continue to be periodically sent until the finite state machine returns to the idle state, at which point time-based message generation stops (at least in this example).

The second type of message in this example is the event-based message (320). As with the other message types, the first field is the 3-bit type field (322), where the value identifies the message as an event-based message.

Next are a 13-bit tag field (324) and 3-bit sub-type field (326). The sub-type field (326) is sometimes referred to as an event identifier field because the various events that are captured and reported by an event-based message are each assigned an event number or identifier. In this example, because the sub-type (i.e., event identifier) field (326) has 3 bits, the event identifiers range from 0 to 7, inclusive.

For some functional modules, having eight event identifiers is sufficient to uniquely identify all events for which recording is desired. However, some functional modules support many different types of operations (e.g., transmit as well as receive), have many intermediate events of interest between a start event and an end event, and/or have a control channel and a data channel (each with its own associated events). Therefore, in some cases, eight event identifiers is insufficient to uniquely identify all of the events for which reporting is desired. In this example, to accommodate such situations, some events share an event identifier value and some portion of the tag field (324) is used to distinguish between the events that share an event identifier value. In cases where an event identifier value is unique (i.e., it is associated with only one event), the tag is used to transmit other information, such as additional status information (e.g., per the instructions in the relevant event-based reporting rule).

Next in the event-based message (320) are two reserved fields. The first reserved field (328) is a 5-bit space reserved for replacement with an identifier of the message-producing functional module. For example, in FIG. 2, a functional module (202) would generate event-based message (320) but leave this first reserved field (328) blank. At the aggregation module (208), the first reserved field (328) is filled in by the aggregation module (208) with the identifier associated with the functional module (202) from which the event-based message (320) was received (e.g., known because the links (206) are dedicated, not shared).

The second reserved field (330) is an 8-bit field that is reserved for replacement with a timestamp. The event message timestamp (330) serves the same purpose as the time-based sequence identifier (304) in the time-based message (300). However, because event-based messages occur more sporadically than time-based messages, they need a larger field to capture a larger time difference between event-based messages (320) or between an event-based message (320) and a timestamp message (340). As with the first reserved field (328), the second reserved field is left blank by a reporting module (e.g., 204 in FIG. 2) and/or functional module (e.g., 202 in FIG. 2) and is filled in at the aggregation module (e.g., 208 in FIG. 2).

The last field in the event-based message (320) is a 32-bit payload field (332), used to carry the payload associated with the relevant event. The specific (status) information that is included in the payload (332) is specified by the relevant event-based reporting rule.

Conceptually, event-based reporting (e.g., using an event-based reporting rule) may be thought of as a (more) sparse reporting technique because only one event-based message is generated when a condition is detected. In contrast, time-based reporting (e.g., using a time-based reporting rule) is a (more) dense reporting technique because time-based messages are continuously generated while the condition is satisfied. As such, time-based reporting will tend to generate many more messages than event-based reporting. To account for this difference, the size of the exemplary time-based message (300) is smaller than the size of the exemplary event-based message (320) in this example (e.g., 16 bits for the exemplary time-based message (300) vs. 64 bits for the exemplary event-based message (320)).

The third message in this example is a timestamp message (340) which includes a 3-bit type field (342) to identify the message as a timestamp message and a 29-bit payload field (344) which is used to store the value of the timestamp. In some embodiments, the timestamp that is written into the second reserved field (330) of the event-based message (320) is the lowest eight bits of the longer timestamp that is included in the payload (344) of the timestamp message (342).

In this example, the timestamp message (340) is not transmitted across the message interconnect (e.g., 206 in FIG. 2). Rather, timestamp messages in this example are generated and inserted by the aggregation module (e.g., 208 in FIG. 2) into the stream written to the message capture memory (e.g., 210 in FIG. 2) for accurate representation, should the message stream be interrupted for any reason (e.g., temporary memory unavailability).

As shown in this example, in some embodiments, timestamping (e.g., at step 106 in FIG. 1) includes inserting a timestamp message (e.g., 340) into an aggregated message stream.

This example also shows that in some embodiments, timestamping (e.g., at step 106 in FIG. 1) includes writing a timestamp into a reserved field (e.g., 330) in the standardized message format (e.g., 320) that is reserved for the timestamp.

The message sizes and formatting illustrated herein are merely exemplary and are not intended to be limiting. In various embodiments, different message sizes, field sizes, and/or field locations may be used.

As is shown in FIGS. 2 and 3, in some embodiments, the reported information (e.g., received at step 100 in FIG. 1) includes a timestamped and aggregated message stream (e.g., sent from the aggregation module (e.g., 208 in FIG. 2) to the memory (e.g., 210 in FIG. 2) and the timestamped and aggregated message stream is generated by an aggregation module (e.g., 208 in FIG. 2) included in the SOC (e.g., 200 in FIG. 2) that is configured to receive hardware event information in a standardized message format (see, e.g., event-based message (320) in FIG. 3) from the hardware functional module (e.g., one of functional modules (200) in FIG. 2), receive firmware event information in the standardized message format (see, e.g., event-based message (320) in FIG. 3) from the firmware functional module (e.g., one of functional modules (200) in FIG. 2) and aggregate and timestamp the hardware event information in the standardized message format and the firmware event information in the standardized message format to obtain the timestamped and aggregated message stream.

In some embodiments, timestamping (e.g., hardware event information in the standardized message format and/or firmware event information in the standardized message format to obtain the timestamped and aggregated message stream) includes writing a timestamp into a reserved field in the standardized message format that is reserved for the timestamp.

In the example of FIG. 3, the sizes of the three exemplary message types (300, 320, and 340) are carefully selected so that in the capture memory (e.g., 210 in FIG. 2), the messages can be uniformly interleaved on message boundaries to prevent partial messages should message overwriting occur. The following figure shows an example of this.

Figure 4:
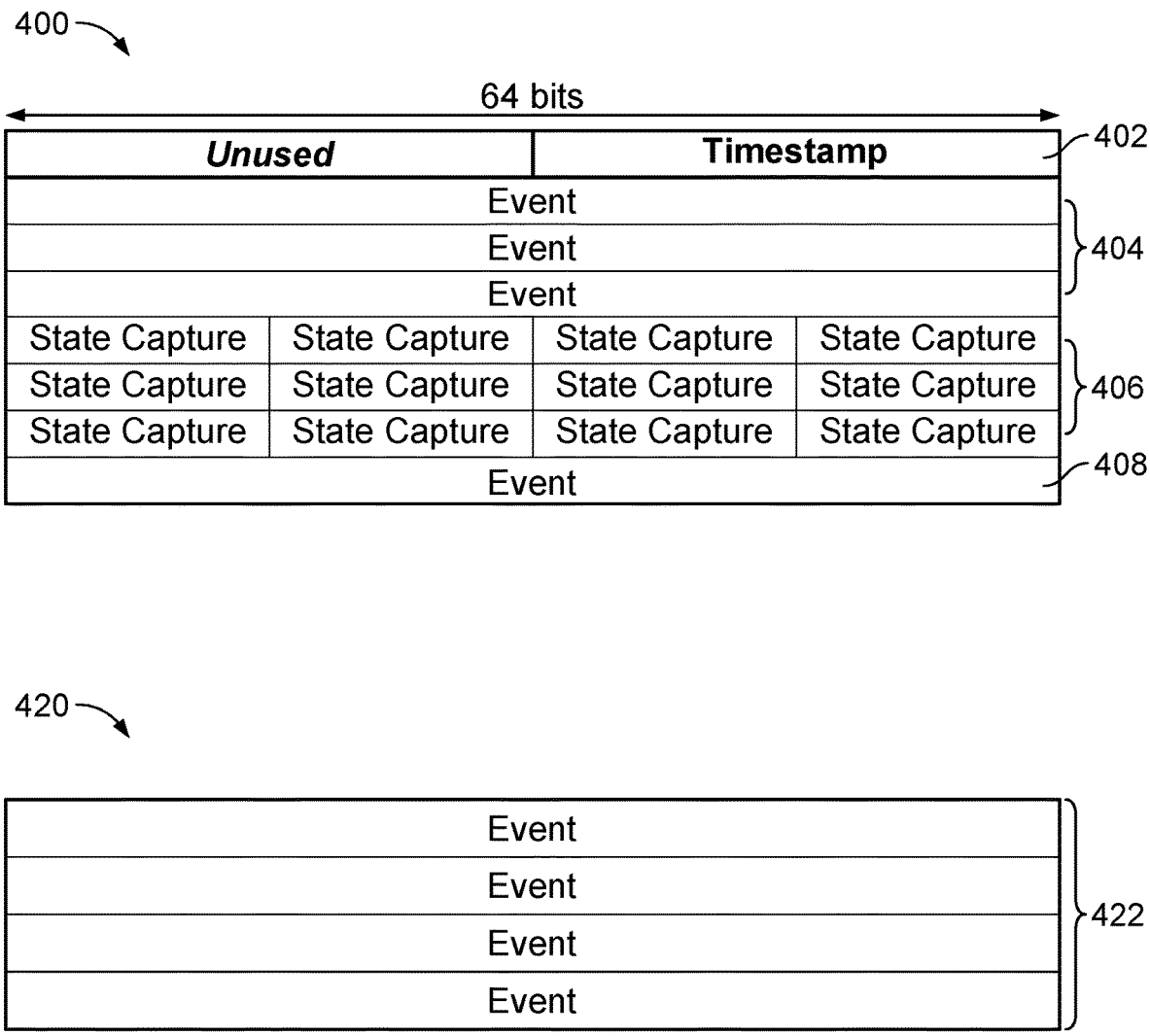
FIG. 4 is a diagram illustrating two embodiments of an aggregated and timestamped message stream in a message capture memory.

FIG. 4 is a diagram illustrating two embodiments of an aggregated and timestamped message stream in a message capture memory. In this figure, a first memory segment (400) and a second memory segment (420) show two examples of aggregated and timestamped message streams that are stored in message capture memory. For example, these two memory segments (400 and 420) show examples of memory (210) in FIG. 2.

In the first memory segment (400), a 32-bit timestamp message (402) occurs first, occupying one half of a 64-bit slot of memory; the remainder of the slot is unused. In this example, each slot of memory is 64 bits and the timestamp message (402) has the example size and format shown in FIG. 3.

Next, three 64-bit event messages (404) each occupy one memory slot so that the second, third, and fourth slots are occupied by event messages.

Then, a sequence of 13 time-based messages (406) is stored. Each time-based message (406) is 16 bits long so the fifth, sixth, and seventh slots each have four time-based messages per slot. In this example, time-based messages are used to capture the state or value of a finite state machine while it is not in the idle state (e.g., from the time it leaves the idle state until the time it returns to the idle state). As such, in this example, the term "state capture" is used to describe the time-based messages (406) but in other embodiments time-based messages are used to capture or record other types of information in a functional module.

The last slot is occupied by an event-based message (408).

In this example, each event-based message (e.g., 404) occupies a single slot whereas time-based messages (e.g., 406) are written four to a slot. The advantage of keeping the sizes and (slot) offsets as shown here is that less overhead information needs to be saved which would be required if (as an example) the event messages could start at any offset within a slot instead of at a zero offset. Similarly, if the message sizes were not multiples of each other and the messages did not align with the slots as shown here, then mixing the two messages randomly would make it very hard to distinguish between message boundaries when an old message is overwritten with a new message, creating partially messages. Partial messages can have missing type identifiers (to distinguish the message type) and/or missing message content (making it hard to identify the end of the message).

It is noted that the various event messages (404 and 408) and state capture (i.e., time-based) messages (406) may be from a variety of functional modules and are not necessarily from a single functional module. Rather, they are aggregated at the aggregation module in the order in which they are received.

A downside to embodiments that generate the first memory segment (400) shown is that supporting multiple message types (each having a different message size) adds to the complexity of the aggregation module. For example, to ensure that the last event message (408) starts at the beginning of the last slot, the aggregation module has to track the number of preceding state capture (i.e., time-based) messages (406) so that if the number is not a multiple of four, one or more unused fourth slots are inserted before the last event message (408). In some applications, a less complex implementation is desired, particularly if the debug system is being implemented for the first time. The following figure shows a less complex embodiment where only event messages are stored.

The second memory segment (420) shows an example where only event-based messages (422) are generated and stored. That is, neither timestamp messages nor state capture (i.e., time-based) messages are generated (e.g., by the reporting modules or the aggregation module) in this example.

A benefit to embodiments that generate and store only event-based messages (as shown in the second memory segment (420)) is that is it much simpler for the aggregation module to store messages because there only one type (and therefore size) of message that is supported. The aggregation module does not need to track the number of timestamp messages or state capture state capture (i.e., time-based) messages and insert unused fourth or half slots where needed. It is also more memory-efficient because there are no unused portions, and the total amount of memory used is less that the first memory configuration because there tend to be many state capture (i.e., time-based) messages whereas event-based messages tend to be more sparse. For these reasons, in some embodiments, only event-based messages are generated and stored.

The following figure illustrates an example Flash storage controller (implemented on an SOC system) that is analyzed and/or debugged using a visualization system per the techniques described herein. Then, example screenshots are described that may be displayed by a visualization system when debugging and/or analyzing the example Flash storage controller.

Figure 5:
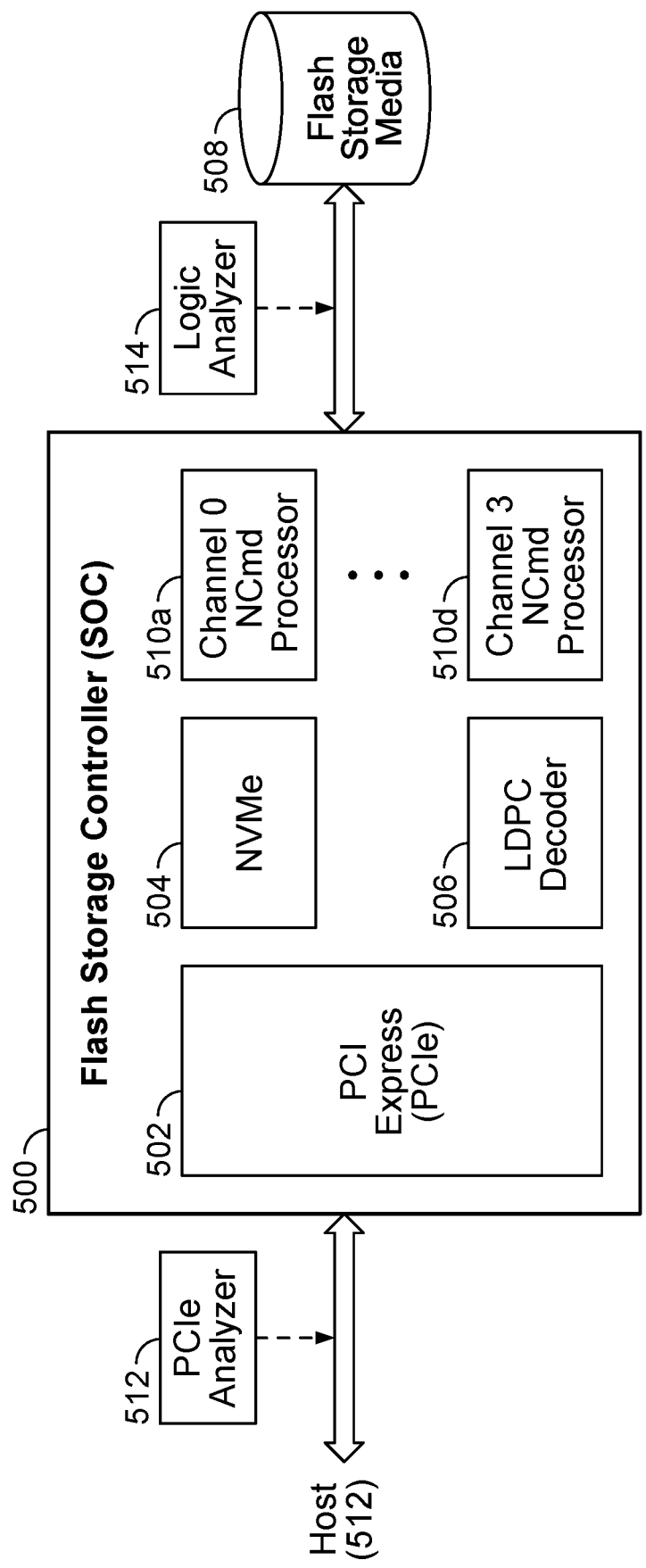
FIG. 5 is a diagram illustrating an embodiment of a Flash storage controller that is implemented on a SOC system.

FIG. 5 is a diagram illustrating an embodiment of a Flash storage controller that is implemented on a SOC system. The Flash storage controller (500) is one example of the SOC system (200) in FIG. 2 that generates hardware-reported information and firmware-reported information, and that is subsequently debugged and/or analyzed by a visualization system (e.g., per FIG. 1) using that hardware-reported information and firmware-reported information. To preserve the readability of the diagram and for ease of explanation, a sampling of exemplary hardware functional modules and firmware functional modules is shown here; this is not intended to be a complete functional block diagram. For example, although only hardware functional modules are described herein, in some embodiments, other embodiments include firmware functional modules that are configured to report status information.

In this example, the Flash storage controller (500) includes a PCI Express (PCIe) functional module (502). In some embodiments, the PCIe (502) is a hardware functional module and IP core. For example, a third party may sell the PCIe functional module and purchasers "drop" the IP core into their SOC designs.

Another functional module in this example is the non-volatile memory (NVMe) (504). In this example, the NVMe (504) is a hardware functional module that communicates with the host driver to receive host commands (e.g., initiate data fetches or copies to or from the host, etc.) and it is the logical protocol layer over the physical PCIe layer.

The LDPC decoder (506) is a hardware functional module that performs error correction decoding on the data that is stored in the Flash storage media (508). For example, data stored on the Flash storage media (508) may experience data degradation due to charge leakage. This is especially true for data that has been stored for a relatively long time on the Flash storage media (508) and/or when the Flash storage media (508) is worn out and "leaky" (e.g., when the Flash storage media (508) has experienced a relatively large number of program and/or erase cycles). During a read operation, the LDPC decoder (506) may introduce a significant amount of delay when significantly degraded read data is being error corrected because the LDPC decoder must resort to more powerful decoding techniques which also consuming consume more time. Therefore, when analyzing the performance of the read path, the LDPC decoder (506) may be of interest since it may add significant delay.

The Flash storage controller (500) also includes Channel 0 NCmd Processor (510a)—Channel 3 NCmd Processor (510d) which are hardware functional modules. These functional modules are the processors that interface with the four channels via which commands are received. The number of channels shown here is merely exemplary and for larger throughput applications there may be more channels.

The following table illustrates some example events reported by the functional modules shown in FIG. 5 that are subsequently used to analyze the performance of the Flash storage controller (500) and/or debug the Flash storage controller (500). For brevity, similar or the same events that relate to multiple functional modules are not necessarily shown. For example, each functional module may report error event(s), which is useful for debugging, but for brevity Table 1 only shows an error event for the PCIe functional module.

TABLE 1

Example events that are reported by the example functional modules shown in FIG. 5.

| Functional Module | (Reported) Event | Event Description |
| --- | --- | --- |
| PCIe | Low Power | Reports when PCIe low-power modes and/or operations occur |
| | Error | Reports when a PCIe error event occurs |
| NVMe | ReadXferDone | End of read operation |
| | WriteXferDone | End of write operation |
| | NVMe Cmd Fetch End | End of command fetch operation |
| | BAR0 Write | When a write to BAR0 occurs (BAR0 is the memory space in the controller that the host writes into to communicate command information) |

TABLE 1-continued

Example events that are reported by the example
functional modules shown in FIG. 5.

| Functional Module | (Reported) Event | Event Description |
|---|---|---|
| Channel 0 NCmd Processor | SCMD Xfer Done | Channel 0 has completed a transfer |
| Channel 1 NCmd Processor | SCMD Xfer Done | Channel 1 has completed a transfer |
| Channel 2 NCmd Processor | SCMD Xfer Done | Channel 2 has completed a transfer |
| Channel 3 NCmd Processor | SCMD Xfer Done | Channel 2 has completed a transfer |
| LDPC Decoder | Decode Write Data Xfer End | End of error correction decoding |

A benefit to the visualization system described herein is that it eliminates the need for external and/or physical analyzers, which may be expensive, large, and/or limited in some way. In FIG. 5, for example, a PCIe analyzer (513) sits between the host (513) and the Flash storage controller (500). This side of the Flash storage controller (500) is sometimes referred to as the front-end. PCIe analyzers are sometimes used to analyze and/or debug SOC systems that include a PCIe functional module (502). In this example, a visualization system provides and/or supports operations related to PCI analysis such that a physical PCIe analyzer (513) is not required. PCIe analyzers are very expensive (e.g., on the order of hundreds of thousands of dollars) so being able to analyze PCI-related communications and/or operations without having to buy a PCIe analyzer is desired. Furthermore, in some instances, access to the Flash storage controller (500) is difficult and/or there is not enough room around the Flash storage controller (500) to attach a PCIe analyzer. For example, in an enterprise and/or cloud storage system, there may be many Flash storage controllers packed in tightly together, and there may not be sufficient room to access the Flash storage controllers and attach a PCIe analyzer (513).

Another analysis and/or tool that the visualization system may eliminate a need for is a logic analyzer (514) which sits between the Flash storage controller (500) and the Flash storage media (508). This side of the Flash storage controller (500) is sometimes referred to as the back-end. In this example, a visualization system provides and/or supports operations related to logic analyzer such that a logic analyzer (513) is not required. Logic analyzers (514) run at slower speeds compared to SOC systems; for example, the former may only run in the hundreds of kHz whereas the latter are typically in the MHz range. Therefore, when a logic analyzer is used, the SOC system (e.g., 500) must be slowed down, which in some cases eliminates or hides a bug or performance issue. In contrast, with the analysis techniques described herein, the SOC system can be run at their normal operating clock frequencies which helps to expose or otherwise recreate a bug or performance issue. Logic analyzers (514) also tend to be memory limited, so that only limited during and/or limited number of signals can be captured, displayed, and analyzed. With the Flash storage controller (500) application shown in FIG. 5, the size of the Flash storage media (508) (for example, in which hardware-reported and firmware-reported information is stored before being retrieved by a visualization system) is much larger and exceeds the storage capacity of a logic analyzer (514) by orders of magnitude.

Furthermore, the features offered by PCIe analyzers and logic analyzers may also be relatively crude and/or incomplete compared to the features and/or tools offered by a visualization system (i.e., the visualization system offers features and/or tools that PCIe analyzers and logic analyzers do not). For example, PCIe analyzers and logic analyzers do not have access to the various intermediate events within the hardware and firmware functional modules which can be instrumental in identifying bugs (e.g., determining that a system "hang" occurred because one of the firmware functional modules and/or hardware functional modules did not properly signal an end event to end an operation and/or release a shared resource) and/or improving performance (e.g., having access to die usage information reported by the firmware functional modules and/or hardware functional modules to ensure die interleaving is occurring is a(n) (more) efficient manner). The following figures show some example displays presented by a visualization system, some or all of which are not supported by PCIe analyzers or logic analyzers.

Figure 6:
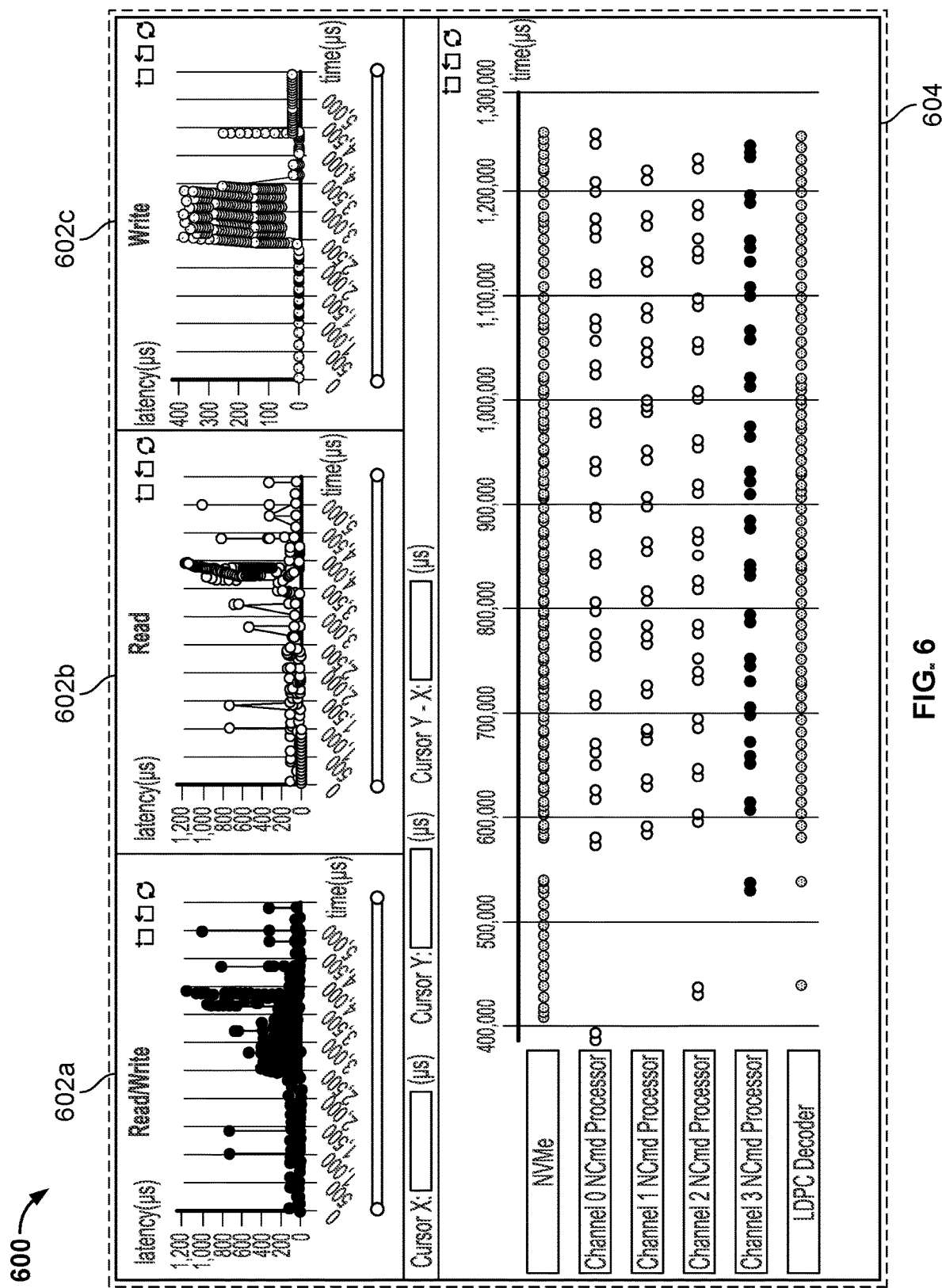
FIG. 6 is a diagram illustrating an embodiment of performance-related visual information associated with read and write operations for a Flash storage controller.

FIG. 6 is a diagram illustrating an embodiment of performance-related visual information associated with read and write operations for a Flash storage controller. In this example, the display (600) shows latency information for multiple read and write operations performed by the Flash storage controller (500) from FIG. 5. This display (600) shows one example of visual information that may be displayed by a visualization system at step 106 in FIG. 1.

At the top of the display are three latency graphs: a left graph (602a) showing read latencies and write latencies, a center graph (602b) showing (ust) read latencies, and a right graph (602c) shows (ust) write latencies. All of the graphs (602a-602c) have time as the x-axis and in this example those x-axis time values are obtained from a timestamp field (e.g., 330 in FIG. 3) in an event-based message (e.g., 320 in FIG. 3).

In this example, the read latency values (shown in the read and write latency graph (602a) and read latency graph (602b)) are calculated by subtracting the timestamp from a "ReadXferStart" event-based message (which corresponds to the start of a read operation) generated by the NVMe functional module from the (later) timestamp from the corresponding "ReadXferEnd" event message (which corresponds to the completion of a read operation). Corresponding read event messages are identified by having the same value in an appropriate field of the beginning and ending event messages. As similar calculation may be performed for write latencies using "WriteXferStart" and "WriteXferEnd" event-based messages.

The read latency graph (602b) shows that the fastest read latencies are within the range of 0-100 us whereas the slowest read latencies are within the range of 1,000-1,200 us. The write latency graph (602c) shows that the fastest write latencies are within the range of 0-25 us whereas the slowest write latencies are within the range of 300-400 us. By clicking on or selecting one of the slower latencies in one of the latency graphs (602a-602c), the visualization system in response updates the event information window (604) to display related event information for the selected read or write latency. This can, for example, help SOC developers to identify inefficiencies in the read or write path.

In this example, the Flash storage controller is already manufactured, so any short-term improvements (e.g., identified by the latency analysis shown in FIG. 5) may be implemented by adjusting settings (e.g., in hardware and/or firmware) and/or by updating the firmware running on the SOC. Long-term (e.g., hardware) improvements that are directed to hardcoded inefficiencies may be implemented in (hardware) register transfer language (RTL) so that the next generation of the SOC system is manufactured with those (hardware) improvements.

As is shown in this example, in some embodiments, the SoC (e.g., referred to in FIG. 1) includes a Flash storage controller and the visual information (e.g., displayed at step 106 in FIG. 1) includes latency information.

The bottom window (604) shows events that are reported by the functional modules. Each row corresponds to a functional module and the dots in each row correspond to an event that was reported by that functional module. The following figure shows a zoomed-in view when a first cursor (e.g., Cursor X) and a second cursor (e.g., Cursor Y) are set to a first and second time, respectively.

Figure 7:
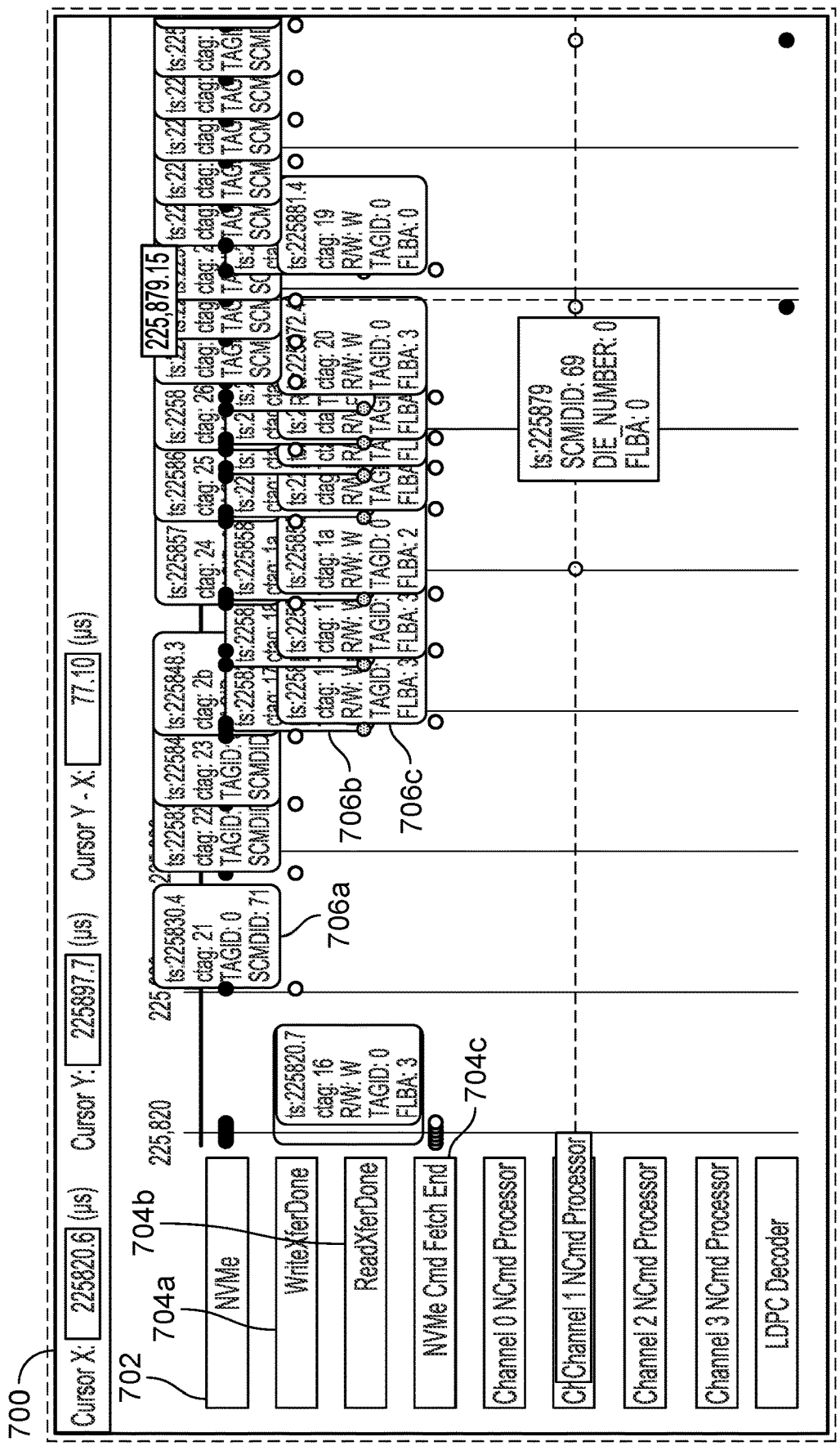
FIG. 7 is a diagram illustrating an embodiment of a zoomed-in window showing information from event-based messages that are reported by an NVMe functional module in a Flash storage controller.

FIG. 7 is a diagram illustrating an embodiment of a zoomed-in window showing information from event-based messages that are reported by an NVMe functional module in a Flash storage controller. In this example, the display (700) corresponds to a zoomed-in version of the bottom window (604) from FIG. 6.

In this example, the NVMe functional module (702) has been expanded to show the events WriteXferDone (704a), ReadXferDone (704b), and NVMe Cmd Fetch End (704c) that are reported by the NVMe functional module (702). To the right of each event (704a-704c) are the fields, contents, and/or payload of the event-based messages associated with the respective events. As shown in this example, WriteXferDone messages (706a) include a timestamp, a ctag (e.g., a type of tag), a TAGID (e.g., a type of identifier), and a SCMDID (e.g., another identifier); ReadXferDone messages (706b) include a timestamp and a ctag; and NVMe Cmd Fetch End messages (706c) include a timestamp, a ctag, a read/write (R/W) indicator, a TAGID, and an FLBA (e.g., a type of address).

The following figure describes this technique of (e.g., automatically) calculating latency using starting and ending messages more generally and/or formally in a flowchart.

Figure 8:
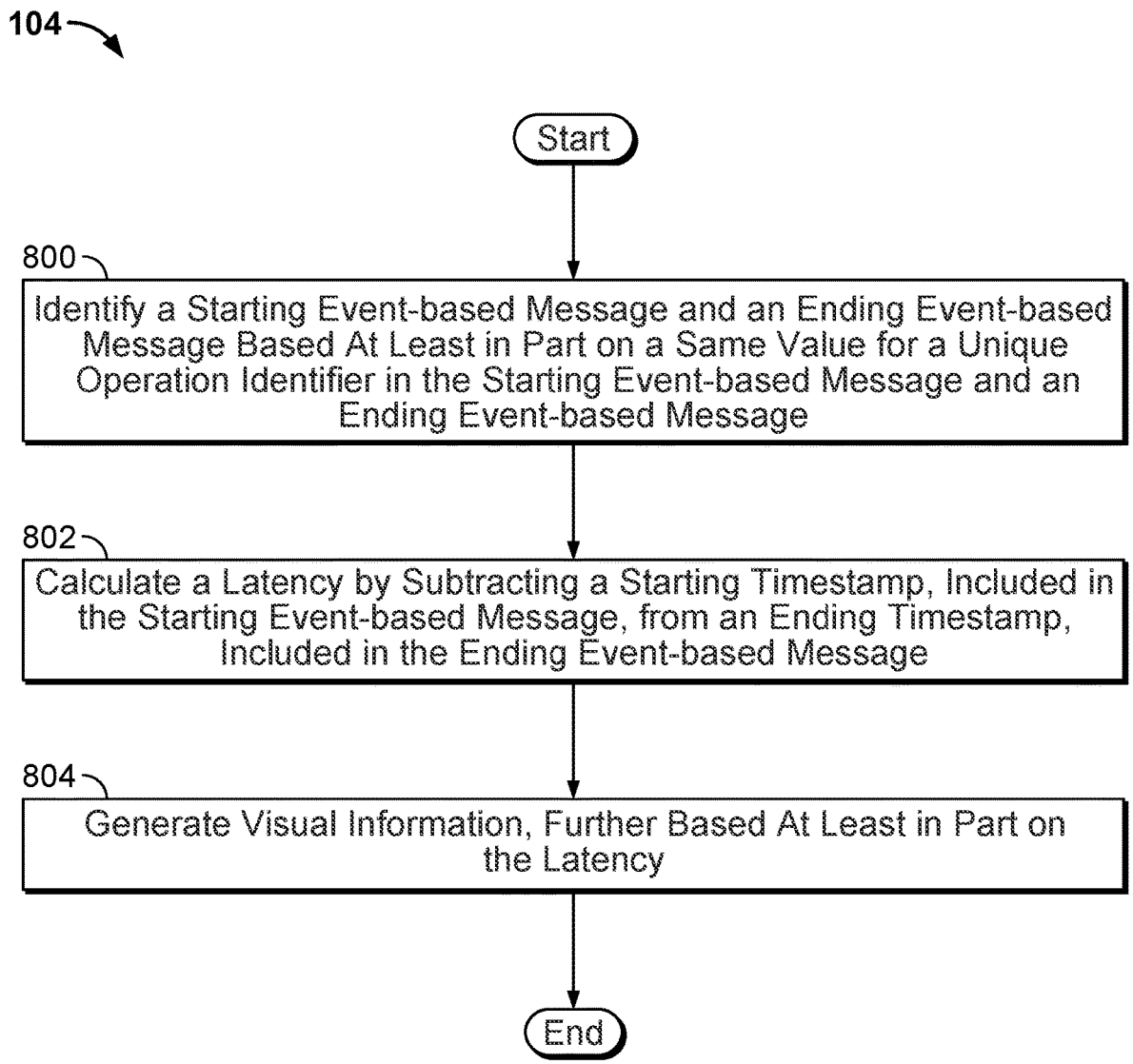
FIG. 8 is a diagram illustrating an embodiment of a process to generate visual information using a latency.

FIG. 8 is a diagram illustrating an embodiment of a process to generate visual information using a latency. In some embodiments, generating visual information at step 104 in FIG. 1 includes the performing the process of FIG. 8. In one example, the process of FIG. 8 is performed by the visualization system (214) shown in FIG. 2.

At 800, a starting event-based message and an ending event-based message are identified based at least in part on a same value for a unique operation identifier in the starting event-based message and an ending event-based message.

For example, in Table 1 (above), there is a ReadXferDone event message. The NVMe may be configured to generate a related ReadXferStart event message. Both messages may include a field or value that uniquely identified corresponding starting and ending event-based messages (e.g., the tag fields (324) or some part of the payload field (332) in the event-based message (320) in FIG. 2 have the same value). This may be a command sequence number, a location of data being processed, a location of a command, etc. and they will have the same value in the starting and ending event-based messages.

At 802, a latency is calculated by subtracting a starting timestamp, included in the starting event-based message, from an ending timestamp, included in the ending event-based message. See, for example, the timestamp field (330) in the event-based message (320) in FIG. 2.

At 804, visual information is generated, further based at least in part on the latency. In FIG. 6, for example, the left graph (602a) shows a plurality of read and write latencies plotted along the y-axis, the center graph (602b) shows read latencies plotted along the y-axis, and the right graph (602c) shows write latencies plotted along the y-axis. The y-axis values of those plotted points are based on the latency values that are calculated.

Latency information is only one type of information that may be displayed to debug and/or analyze (e.g., the performance of) an SOC system. The following figures show a variety of display embodiments showing a variety of visual information. By seeing a visual representation of various metrics (e.g., latency range over time, gaps in successive operations or events in high-level operations, etc.) it is easier to identify outliers and obtain information about the outliers to identify which functional modules and/or stages in the system has unintended delays.

Figure 9:
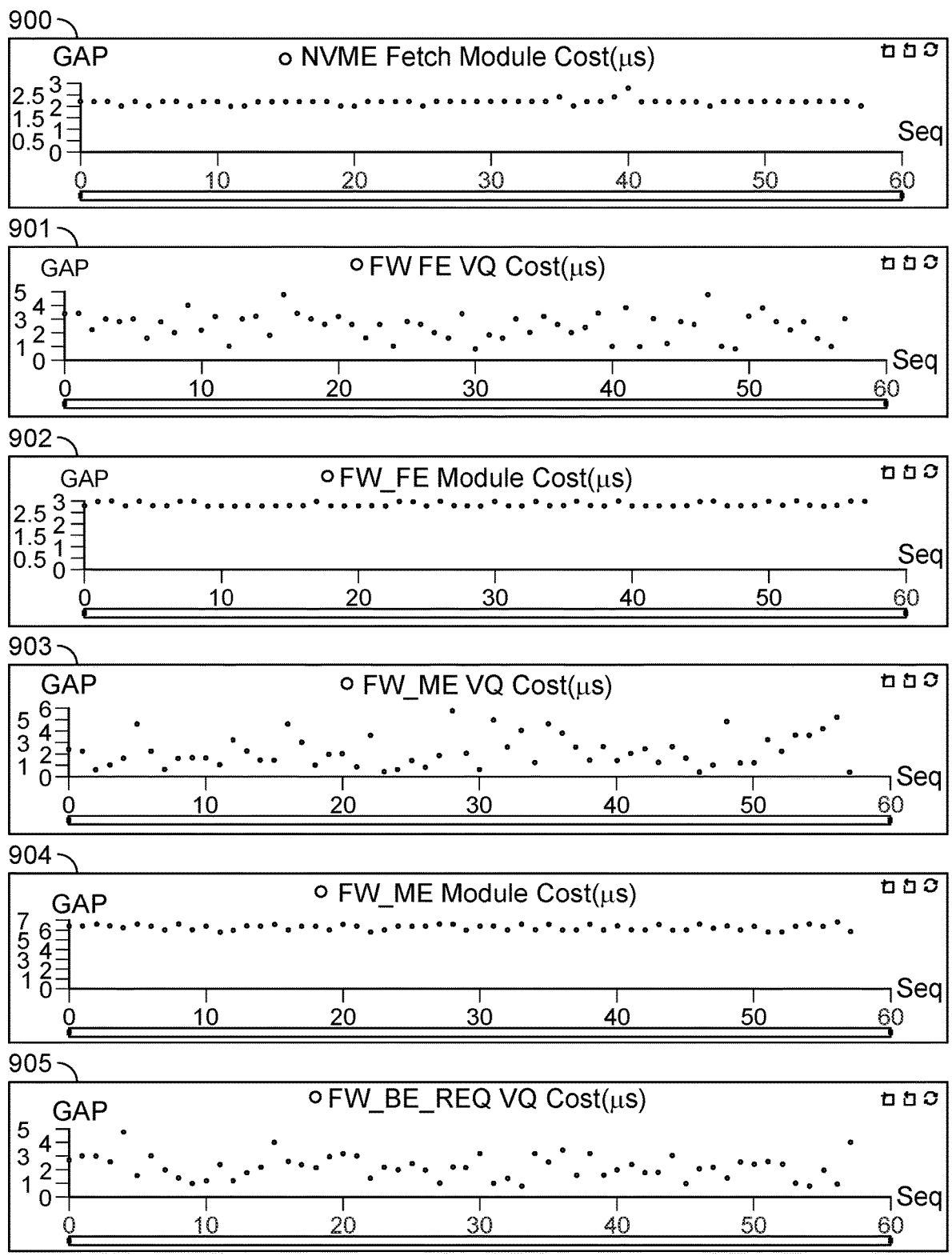
FIG. 9 is a diagram illustrating an embodiment of visual information showing gap values associated with a front-end, a middle-end, and a back-end of a Flash storage controller.

FIG. 9 is a diagram illustrating an embodiment of visual information showing gap values associated with a front-end, a middle-end, and a back-end of a Flash storage controller. In this example, the graphs (900-905) are 2D graphs with an x-axis of sequence number and a y-axis of gap values (e.g., between successive events, in units of s). Each graph shows gap values for a different functional module and/or different events for a given functional module.

The top graph (900) shows gap values between successive fetch operations at the NVMe module ("NVMe Fetch Module Cost" in the graph). The second-from-top graph (901) shows gap values between successive events or operations at a firmware front-end virtual queue ("FW FE VQ cost" in the graph). The third-from-top graph (902) shows gap values between successive events or operations at a firmware front-end module ("FW_FE Module Cost" in the graph). The third-from-bottom graph (903) shows gap values between successive events or operations at a firmware middle-end virtual queue ("FW_ME VQ Cost" in the graph). The second-from-bottom graph (904) shows gap values between successive events or operations at a firmware middle-end module ("FW_ME Module Cost" in the graph). The bottom graph (905) shows gap values between request events or operations at a firmware back-end virtual queue ("FW_BE_REQ VQ Cost" in the graph).

In one example to illustrate how a gap value may be calculated, the logged or recorded event information (e.g., event-based messages generated by a functional module) may include sequence numbers or other relating or identifying information (e.g., to identify which events are the successive events of interest) and the timing information (e.g., a timestamp field in the event-based message) may be used to calculate the gaps; from the event and timing information, gap information for successive events may presented as shown here.

Figure 10:
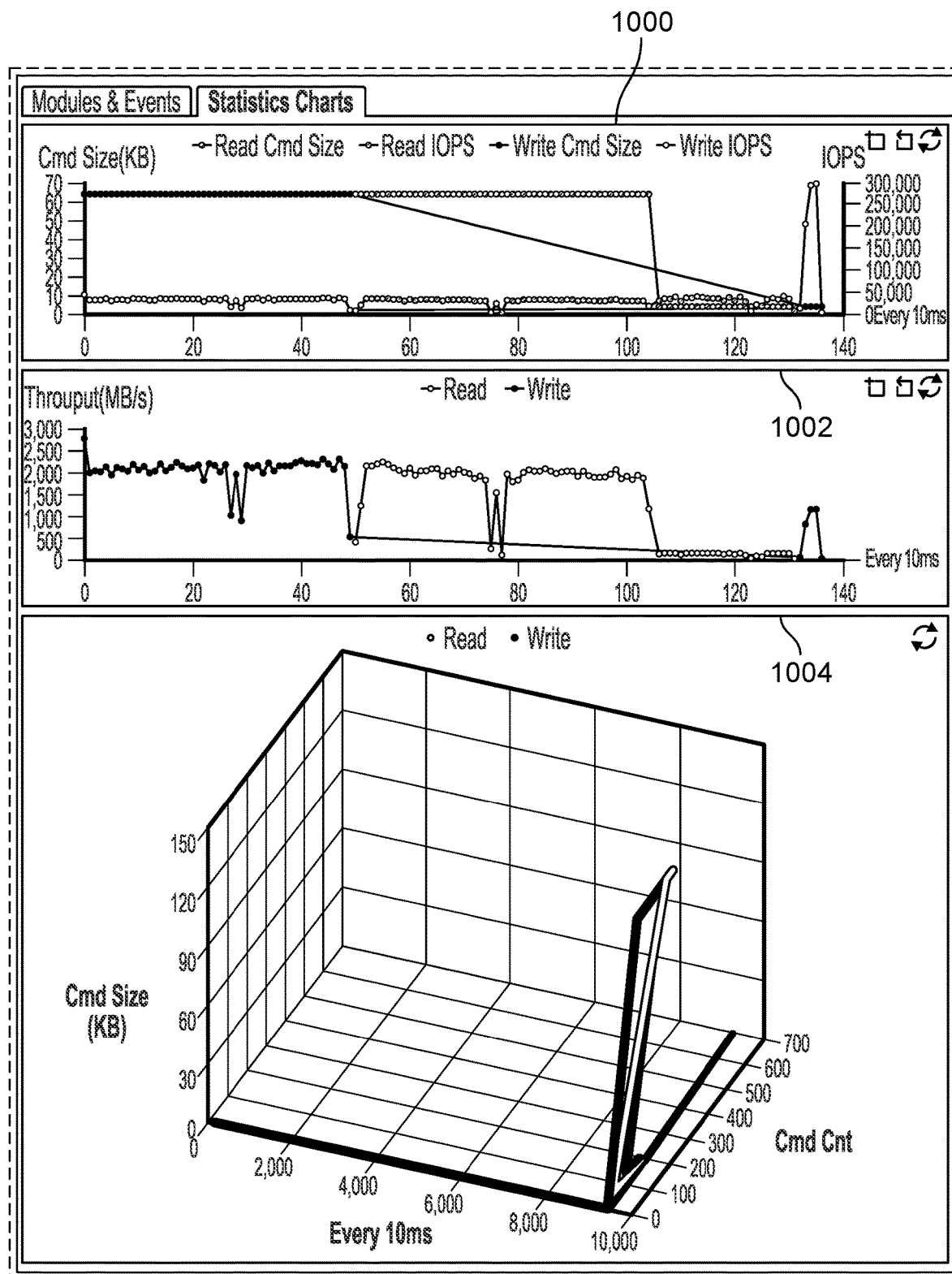
FIG. 10 is a diagram illustrating an embodiment of visual information showing workload metrics for a Flash storage controller.

FIG. 10 is a diagram illustrating an embodiment of visual information showing workload metrics for a Flash storage controller. In this example, the top graph (1000) shows, for both reads and writes, input/output operations per second (IOPS) along the left y-axis and command size for reads and writes along the right y-axis. The middle graph (1002) shows read and write throughput. The bottom graph (1004) shows a 3D graph of command size, time, and command count (as the three axes) for reads and writes.

Figure 11:
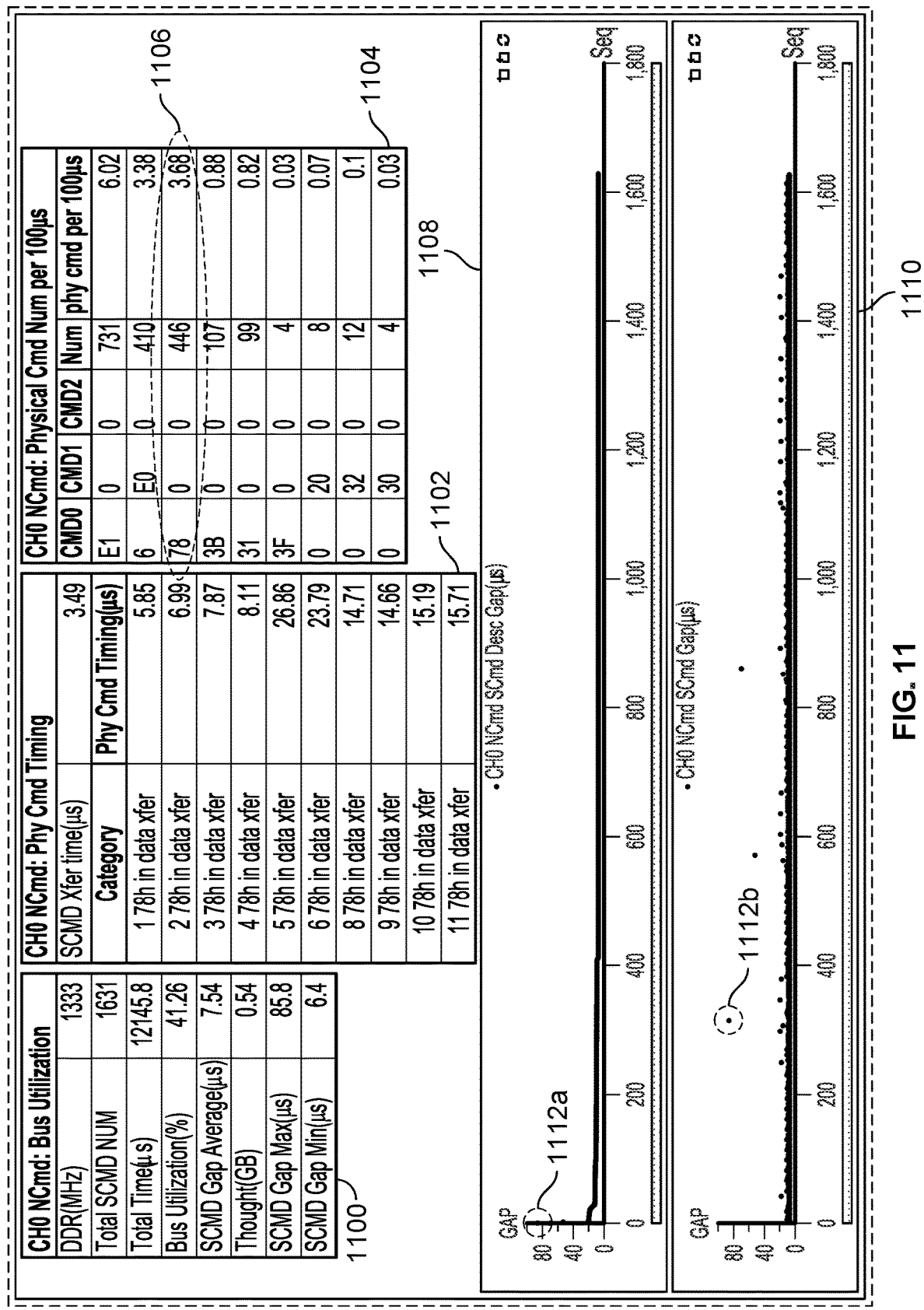
FIG. 11 is a diagram illustrating an embodiment of visual information showing bus utilization for one channel in a Flash storage controller.

FIG. 11 is a diagram illustrating an embodiment of visual information showing bus utilization for one channel in a Flash storage controller. In this example, three tables with command statistics are shown at the top: bus utilization (1100) at left, physical command timing (1102) for channel 0 at center, and physical command numbers (i.e., count) per 100 s (1104) for channel 0 at right. These metrics are associated with bus utilization from a command code point of view. In some applications, this helps to understand whether some commands are issued more than is (e.g., absolutely) necessary to achieve a desired outcome or operation. A chip developer or designer may review the information shown in these examples to identify performance improvements (e.g., optimize the number, size, and/or sequence of commands to achieve the same functionality but more efficiently and/or faster).

For example, the command (in hexadecimal) of 0×78 is issued by the Flash storage controller to the Flash to read out if the Flash has completed a write or read operation requested. This 0×78 is sometimes referred to herein as a status check. Sending too many status check commands brings down bus utilization. Knowing this overhead allows unnecessary status check commands to be identified and eliminated. See, for example, the circled row (1106) that shows that status check commands occupy 3.68% bus utilization for the channel in question.

The graphs (1108 and 1110) at the bottom show the gaps between SCmd (e.g., between two successive commands passed from firmware to hardware). The top graph (1108) is a histogram and/or distribution that has been sorted according to gap values. The bottom graph (1110) is the unsorted version of the information and is ordered by sequence number or time. In this example, each gap value is calculated by subtracting the timestamp of a previous SCmd end with the timestamp of a current (i.e., next) SCmd end.

In this example, the maximum gap (1113*a* and 1113*b*) is on the order of 80 s whereas the average gap value is 7.45 s. In an ideal system there should be no outliers, particular with that much deviation from the average gap value. By identifying and analyzing such outliers, unnecessarily long gaps in firmware processing time may be identified and mitigated. Mitigating this gap also leads to higher Flash bus utilization. In this example, the displayed information is generated from hardware functional module events but also helps to represent, identify, and/or isolate hardware-firmware interaction delays.

As is shown in this example, in some embodiments, the SoC (e.g., referred to in FIG. 1) includes a Flash storage controller and the visual information (e.g., displayed at step 106 in FIG. 1) includes bus utilization information.

Figure 12:
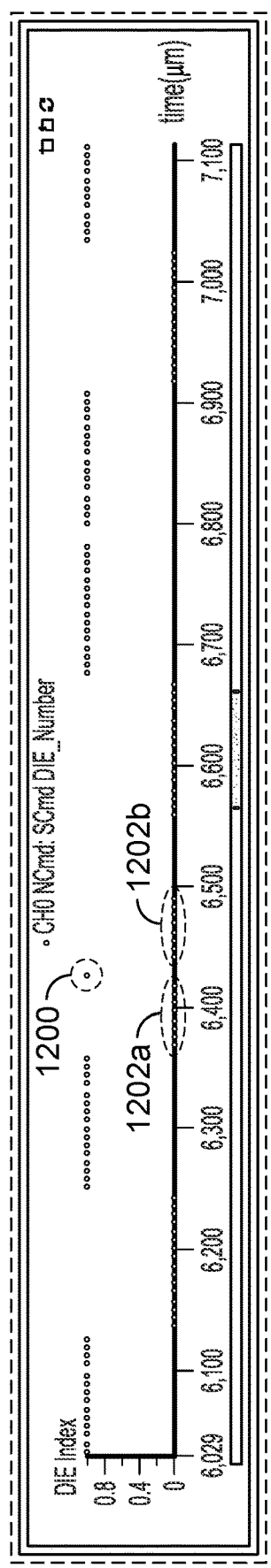
FIG. 12 is a diagram illustrating an embodiment of visual information showing die access information for a Flash storage controller.

FIG. 12 is a diagram illustrating an embodiment of visual information showing die access information for a Flash storage controller. In this example, the Flash storage media (e.g., 508 in FIG. 5) is implemented using multiple die and therefore accessing the Flash storage media includes selected a die to access and some die sequence access patterns are more efficient compared to others. In general, interleaving or switching between die within a particular command set is bad and/or undesirable and successive accesses to the same die (e.g., within a command set) is good and/or desirable.

The visual information presented here permits a developer to quickly and easily identify any inefficiencies in the die access sequence. In this example, there is an isolated access to die index 1 (1200) which interrupts the sequence of accesses to die index 0 (1202*a* and 1202*b*). Identifying such undesirable die access sequences may help a developer understand the underlying problem and make changes in the design so that this interleaving can be eliminated or at least reduced in frequency.

As is shown in this example, in some embodiments, the SoC (e.g., referred to in FIG. 1) includes a Flash storage controller, the Flash storage controller is configured to manage access to Flash storage media that includes a plurality of die, and the visual information (e.g., displayed at step 106 in FIG. 1) includes a die access sequence associated with the plurality of die in the Flash storage media.

Figure 13:
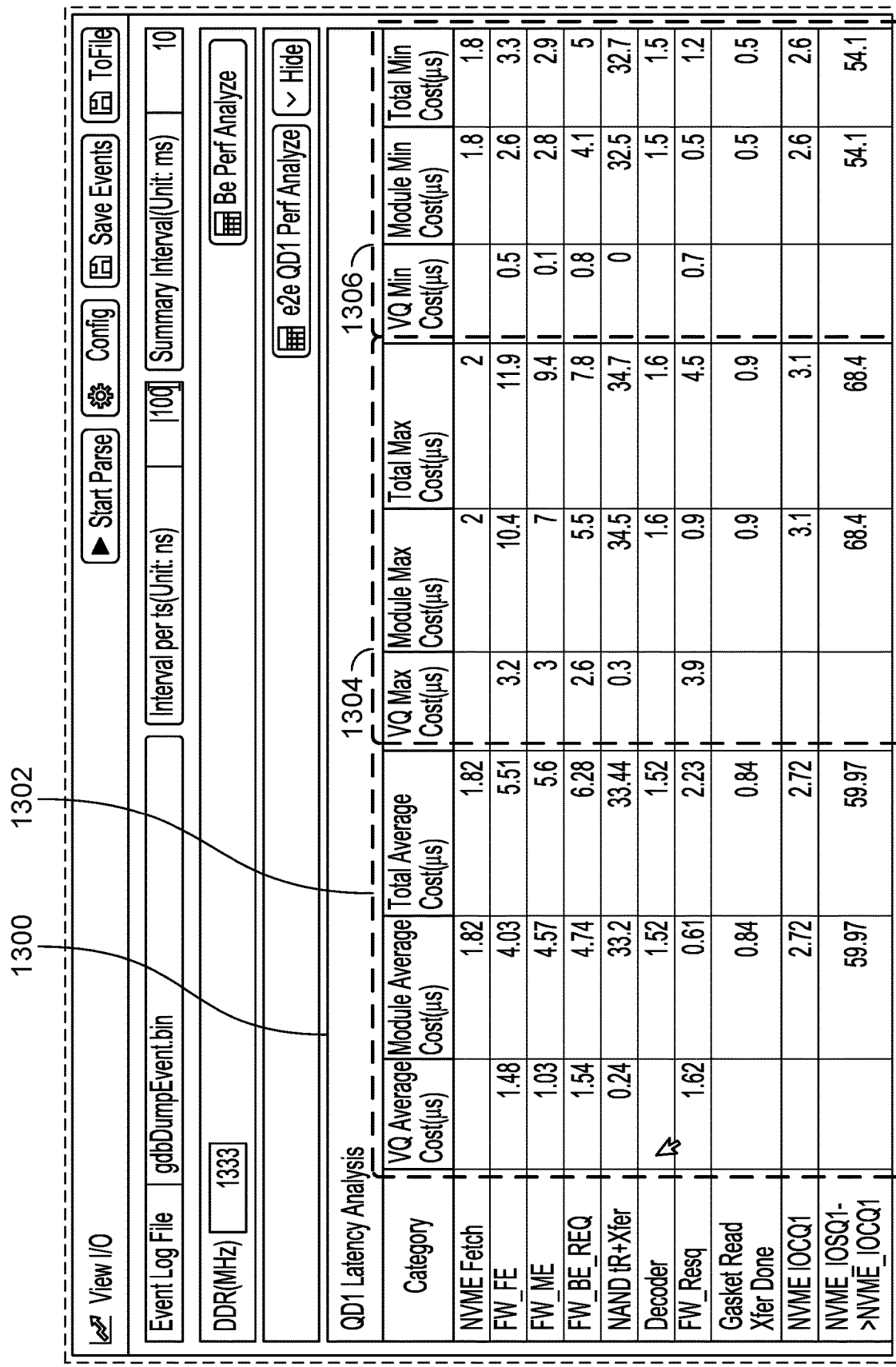
FIG. 13 is a diagram illustrating an embodiment of visual information showing statistical latency information for a Flash storage controller.
Figure 13:
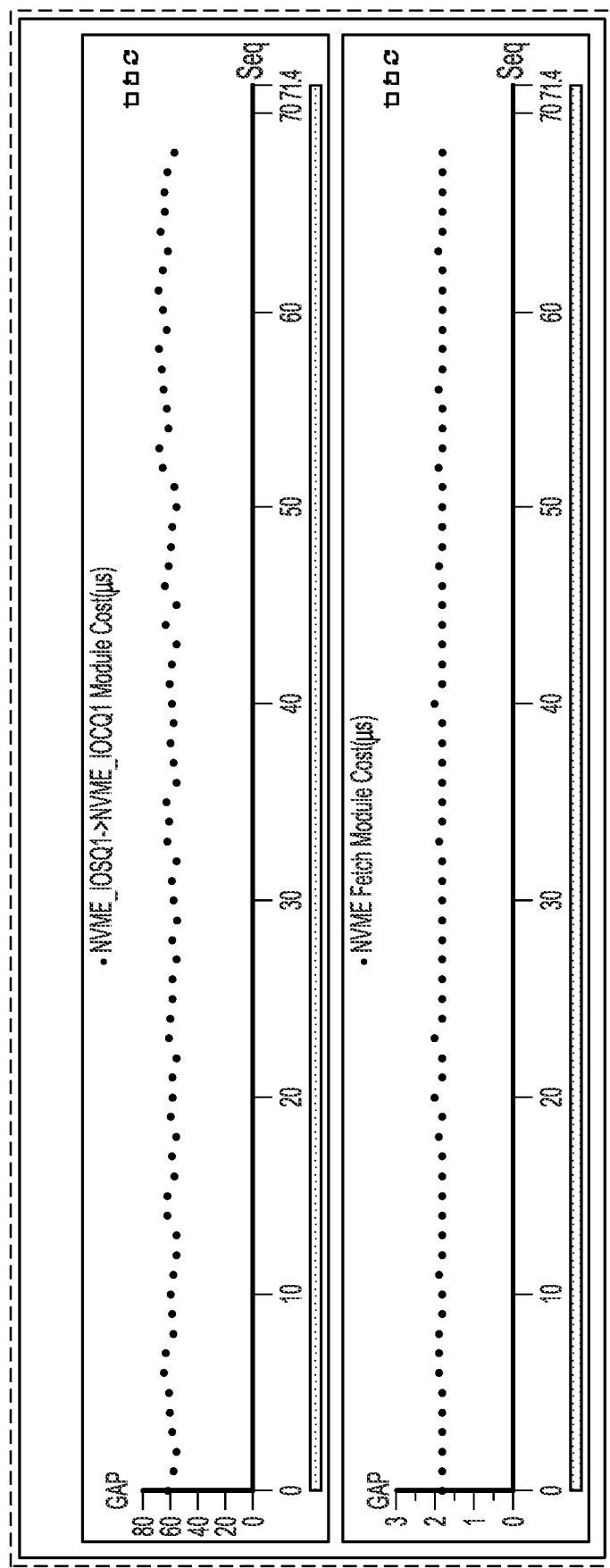

FIG. 13 is a diagram illustrating an embodiment of visual information showing statistical latency information for a Flash storage controller. In this example, the table at the top (1300) has columns with average latency information (1302), columns with maximum latency information (1304), and columns with minimum latency information (1306).

Figure 14:
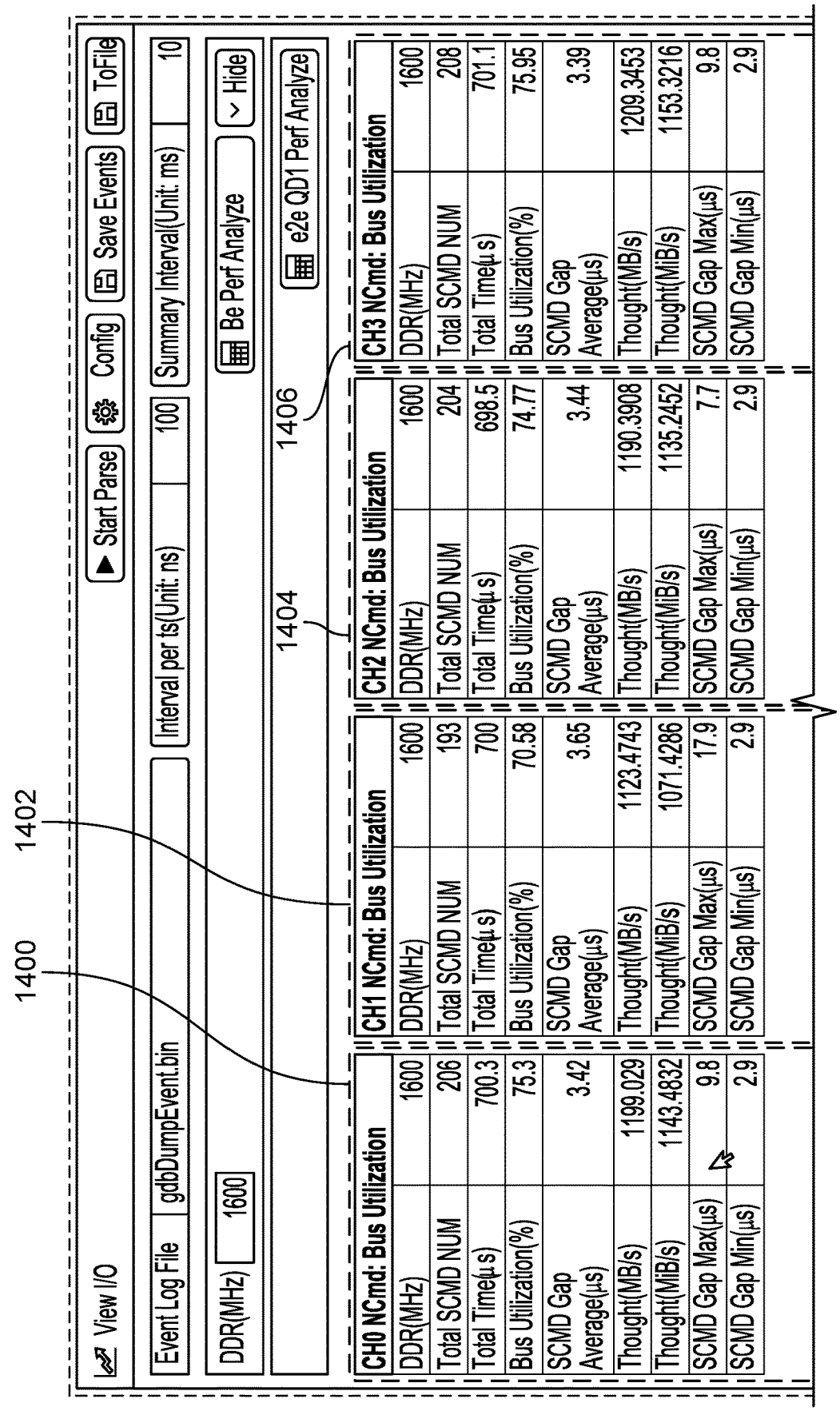
FIG. 14 is a diagram illustrating an embodiment of visual information showing bus utilization information for all four channels in a Flash storage controller.

FIG. 14 is a diagram illustrating an embodiment of visual information showing bus utilization information for all four channels in a Flash storage controller. The example of FIG. 14 is similar to that of FIG. 11, except bus utilization, physical command timing, and physical command numbers are shown for all four channels (see, e.g., groups 1400, 1402, 1404, and 1406) instead of just a single channel. By comparing this information side-by-side, it may be easier to identify deviations and/or underutilizations between the different channels.

In the above examples, the information presented by the various analysis tools and/or operations depends upon certain event-based messages in the firmware-reported data and/or hardware-reported data. Due to storage limitations, it may not always be feasible to generate all types of event-based messages. The following figure describes an example where an appropriate template is sent out by the visualization system to configure an SOC system to generate the proper (e.g., event-based) messages that will permit the visualization system to display a desired graph, table, or other type of (e.g., visual) information.

In some embodiments, a visualization system includes various templates that describe, for a given visual display or type of information to report, what event-based messages should be enabled and/or otherwise reported by the various functional modules. For example, to generate the die (index) access sequence shown in FIG. 12 may take a certain set of event-based messages from the functional modules in the SOC while the bus utilization information shown in FIG. 11 may require a different set of event-based messages from the functional modules in the SOC.

Figure 15:
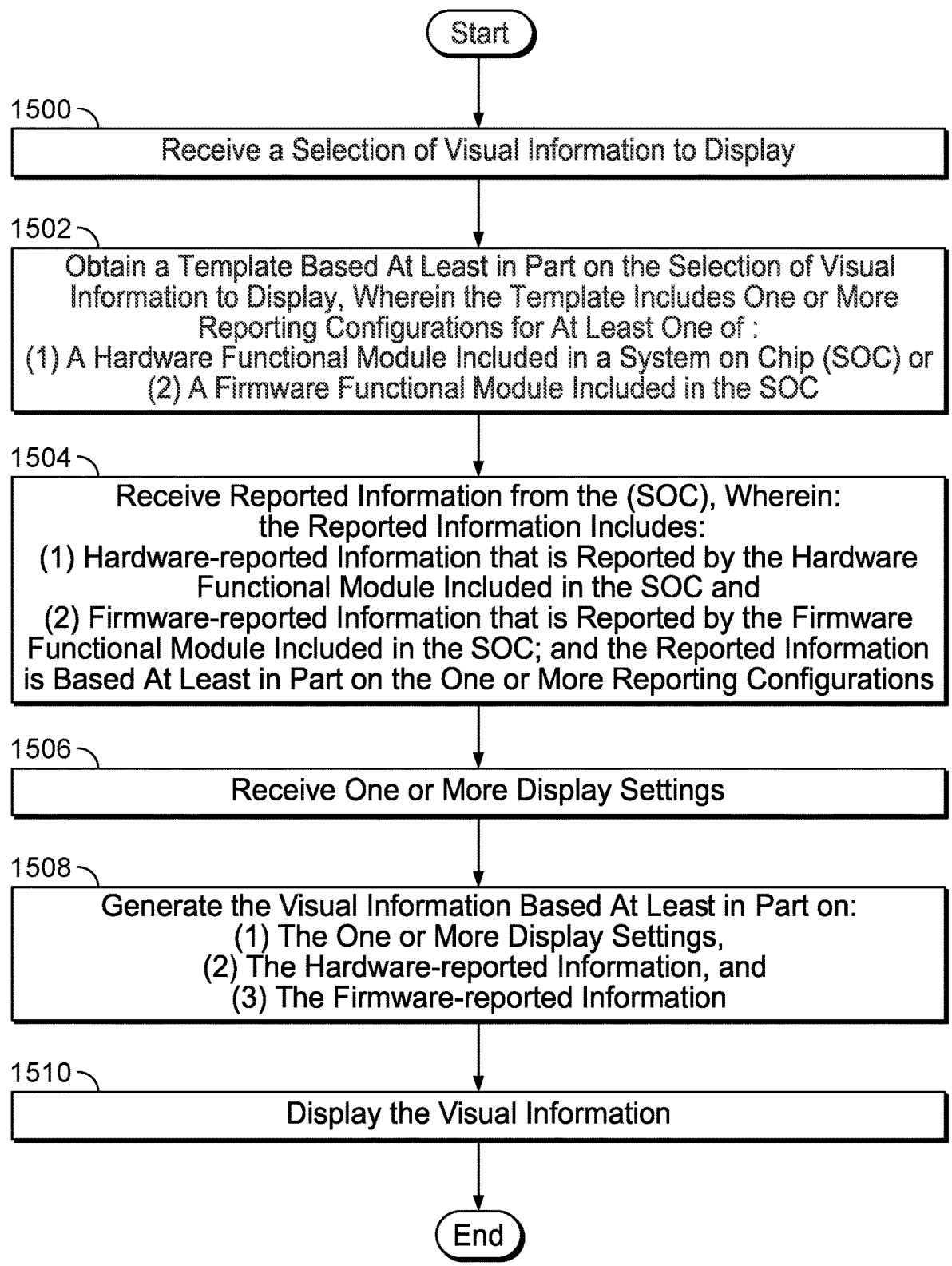
FIG. 15 is flowchart illustrating an embodiment of a process to display visual information using hardware-reported information and firmware-reported information generated using a template from a visualization system.

FIG. 15 is flowchart illustrating an embodiment of a process to display visual information using hardware-reported information and firmware-reported information generated using a template from a visualization system. In one example, the process of FIG. 15 is performed by the visualization system (214) in FIG. 2.

At 1500, a selection of visual information to display is received. For example, via a graphical user interface of the visualization system, a user may select one of the displays, graphs, tables, or other example visual information shown above to be displayed.

At 1502, a template is obtained based at least in part on the selection of visual information to display, wherein the template includes one or more reporting configurations for at least one of: (1) a hardware functional module included in a system on chip (SOC) or (2) a firmware functional module included in the SOC. In some embodiments, the templates are pre-generated and selected from some collection of stored templates. In some embodiments, a template is generated in real-time.

In the example of FIG. 2, a template (220) is sent from the visualization system (214) to the reporting modules (204) in the SOC. The reporting configurations in the template (220) are used to configure the reporting modules so that the appropriate (e.g., event-based) messages are generated for the display, analysis, and/or debugging that is desired by a user of the visualization system.

Returning to FIG. 15, at 1504, reported information is received from the SOC, wherein: the reported information includes: (1) hardware-reported information that is reported by the hardware functional module included in the SOC and (2) firmware-reported information that is reported by the firmware functional module included in the SOC; and the reported information is based at least in part on the one or more reporting configurations.

At 1506, one or more display settings are received.

At 1508, the visual information is generated based at least in part on: (1) the one or more display settings, (2) the hardware-reported information, and (3) the firmware-reported information. As described above, the template ensures that the appropriate (e.g., event-based) messages that are needed for the desired visual information has been generated by the SOC.

At 1510, the visual information is displayed. This, for example, is the visual information that was selected at step 1500.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A system, comprising:
an interface configured to receive reported information from a system on chip (SOC), wherein the SOC includes a Flash storage controller, wherein the reported information includes: (1) hardware-reported information that is reported by a hardware functional module included in the SOC and (2) firmware-reported information that is reported by a firmware functional module included in the SOC;
a processor configured to:
receive one or more display settings; and
generate visual information based at least in part on: (1) the one or more display settings, (2) the hardware-reported information, and (3) the firmware-reported information; and
a display configured to display the visual information, wherein the visual information includes latency information that is utilized to identify inefficiencies in a read path or write path associated with the Flash storage controller,
wherein the processor is configured, based on the latency information, to adjust hardware settings associated with the SOC and/or firmware settings associated with the SOC and/or to update firmware running on the SOC to overcome latency associated with the SOC.

2. The system recited in claim 1, wherein:
the reported information includes a timestamped and aggregated message stream; and
the timestamped and aggregated message stream is generated by an aggregation module included in the SOC that is configured to:
receive hardware event information in a standardized message format from the hardware functional module;
receive firmware event information in the standardized message format from the firmware functional module; and
aggregate and timestamp the hardware event information in the standardized message format and the firmware event information in the standardized message format to obtain the timestamped and aggregated message stream.

3. The system recited in claim 2, wherein timestamping includes writing a first timestamp into a reserved field in the standardized message format that is reserved for the first timestamp.

4. The system recited in claim 1, wherein generating the visual information includes:
identifying a starting event-based message and an ending event-based message based at least in part on a same value for a unique operation identifier in the starting event-based message and the ending event-based message;
calculating the latency by subtracting a starting timestamp, included in the starting event-based message, from an ending timestamp, included in the ending event-based message; and
generating latency-related visual information based at least in part on the latency, wherein the visual information includes the latency-related visual information.

5. The system recited in claim 1, wherein
the visual information includes bus utilization information.

6. The system recited in claim 1, wherein
the Flash storage controller is configured to manage access to Flash storage media that includes a plurality of die; and
the visual information includes a die access sequence associated with the plurality of die in the Flash storage media.

7. The system recited in claim 1, wherein:
the system further includes a user interface that is configured to receive a selection of visual information to display; and
the processor is further configured to obtain a template based at least in part on the selection of visual information to display, wherein the template includes one or more reporting configurations for at least one of: (1) the hardware functional module included in the SOC or (2) the firmware functional module included in the SOC.

8. A method, comprising:
using an interface to receive reported information from a system on chip (SOC), wherein the SOC includes a Flash storage controller, wherein the reported information includes: (1) hardware-reported information that is reported by a hardware functional module included in the SOC and (2) firmware-reported information that is reported by a firmware functional module included in the SOC;
receiving, at a processor, one or more display settings;
using the processor to generate visual information based at least in part on: (1) the one or more display settings, (2) the hardware-reported information, and (3) the firmware-reported information;
using a display to display the visual information, wherein the visual information includes latency information that is utilized to identify inefficiencies in a read path or write path associated with the Flash storage controller; and
based on the latency information, adjusting hardware settings associated with the SOC and/or firmware settings associated with the SOC and/or updating firmware running on the SOC to overcome latency associated with the SOC.

9. The method recited in claim 8, wherein:
the reported information includes a timestamped and aggregated message stream; and
the timestamped and aggregated message stream is generated by an aggregation module included in the SOC that is configured to:
receive hardware event information in a standardized message format from the hardware functional module;
receive firmware event information in the standardized message format from the firmware functional module; and
aggregate and timestamp the hardware event information in the standardized message format and the firmware event information in the standardized message format to obtain the timestamped and aggregated message stream.

10. The method recited in claim 9, wherein timestamping includes writing a first timestamp into a reserved field in the standardized message format that is reserved for the first timestamp.

11. The method recited in claim 8, wherein generating the visual information includes:
identifying a starting event-based message and an ending event-based message based at least in part on a same value for a unique operation identifier in the starting event-based message and the ending event-based message;
calculating the latency by subtracting a starting timestamp, included in the starting event-based message, from an ending timestamp, included in the ending event-based message; and
generating latency-related visual information based at least in part on the latency, wherein the visual information includes the latency-related visual information.

12. The method recited in claim 8, wherein
the visual information includes bus utilization information.

13. The method recited in claim 8, wherein
the Flash storage controller is configured to manage access to Flash storage media that includes a plurality of die; and
the visual information includes a die access sequence associated with the plurality of die in the Flash storage media.

14. The method recited in claim 8, wherein:
the method further includes using a user interface to receive a selection of visual information to display; and
the method further includes using the processor to obtain a template based at least in part on the selection of visual information to display, wherein the template includes one or more reporting configurations for at least one of: (1) the hardware functional module included in the SOC or (2) the firmware functional module included in the SOC.

\* \* \* \* \*